US012750686B1

(12) United States Patent
Yu et al.

(10) Patent No.: US 12,750,686 B1
(45) Date of Patent: Sep. 29, 2026

(54) IN-FLIGHT ENTERTAINMENT DEVICE BLUETOOTH MODULE

(71) Applicant: Delta Air Lines, Inc., Atlanta, GA (US)

(72) Inventors: Shaoda Yu, Atlanta, GA (US); Aryan Gupta, Suwanee, GA (US); David Silvio Landeta, West Melbourne, FL (US); Mahesh Gupta, Cumming, GA (US); Joshua Jung, Auburn, WA (US)

(73) Assignee: Delta Air Lines, Inc., Atlanta, GA (US)

( * ) Notice: Subject to any disclaimer, the term of this patent is extended or adjusted under 35 U.S.C. 154(b) by 266 days.

(21) Appl. No.: 18/748,521

(22) Filed: Jun. 20, 2024

(51) Int. Cl.
*H04W 16/14* (2009.01)
*H04W 4/80* (2018.01)
*H04W 84/12* (2009.01)

(52) U.S. Cl.
CPC .............. *H04W 16/14* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 8,693,950 B2 | 4/2014 | Desai | | |
| 9,504,056 B2 | 11/2016 | Desai et al. | | |
| 10,315,770 B2 | 6/2019 | Udriste et al. | | |
| 2007/0183338 A1* | 8/2007 | Singh | H04W 16/14 370/252 | |
| 2010/0041358 A1* | 2/2010 | Wood | H04W 16/14 455/67.11 | |
| 2017/0245204 A1* | 8/2017 | Kumar | H04W 48/16 | |
| 2017/0245285 A1* | 8/2017 | Palin | H04W 72/542 | |

OTHER PUBLICATIONS

Rella, Emily, "'Game Changer': Delta Tried to Quietly Roll Out a New Entertainment Feature—But Then TikTok Found Out," Entrepreneur, Dec. 15, 2023, retrieved at https://www.entrepreneur.com/business-news/delta-enables-bluetooth-connectivity-for-entertainment/467066 on Mar. 15, 2024.

Joyce, Kathleen, "New In-Flight Entertainment Update on Delta Flights is Bringing Them Into the 21st Century," Wanderwisdom News, Dec. 14, 2023, retrieved at https://wanderwisdom.com/news/delta-bluetooth-compatibility on Mar. 15, 2024.

* cited by examiner

*Primary Examiner* — Benjamin Lamont
(74) *Attorney, Agent, or Firm* — Hartman & Citrin LLC

(57) ABSTRACT

An in-flight entertainment device Bluetooth module can include a WiFi transceiver; a WiFi antenna connected to the WiFi transceiver; a Bluetooth transceiver; and a directional Bluetooth antenna connected to the Bluetooth transceiver. The in-flight entertainment device Bluetooth module can detect a connection between the Bluetooth transceiver and an audio device via the directional Bluetooth antenna, trigger a WiFi signal scan by the WiFi transceiver and via the WiFi antenna; and identify, for a detected most-used WiFi channel, Bluetooth channels that share spectrum with the detected most-used WiFi channel. If the Bluetooth channels that share spectrum with the detected most-used WiFi channel are not included in an exclusion list, the Bluetooth channels that share spectrum with the detected most-used WiFi channel can be added to the exclusion list.

20 Claims, 9 Drawing Sheets

IN-FLIGHT ENTERTAINMENT DEVICE BLUETOOTH MODULE

TECHNICAL FIELD

The present disclosure relates generally to in-flight entertainment devices for aircraft. More particularly, the present disclosure relates to an in-flight entertainment device Bluetooth module.

BACKGROUND

Unless otherwise indicated herein, all disclosures in the background are not prior art to the claims in this application and are not admitted to be prior art by inclusion in this section.

Aircraft can be formed from materials such as steel, aluminum, and the like, which can block and/or shield radio waves. Furthermore, modern commercial aircraft may carry hundreds of passengers in a relatively small physical space. Still further, in-flight entertainment has become a popular feature used to distinguish air carriers, with some carriers (e.g., Delta Air Lines) being known for the quality of their in-flight entertainment options such as WiFi connectivity, games, messaging applications, audiovisual content, music, and the like. As such, air carriers may wish to improve the functionality offered by their in-flight entertainment devices.

Audio provided by in-flight entertainment devices may be provided to passengers via wired headphones or earbuds due to the relatively close proximity between passengers. Some carriers give out disposable earbuds to passengers for this specific purpose, i.e., to connect to the in-flight entertainment systems. Wireless earbuds, however, have become very popular and passengers may wish to connect their wireless earbuds to the in-flight entertainment systems. Such connections, however, may pose certain aircraft-specific challenges.

Namely, wireless connections between in-flight entertainment systems and wireless earbuds of passengers may experience interference from other wireless devices onboard. Furthermore, the relatively close quarters between passengers on an aircraft may saturate any given area with radio waves in the shared frequencies of some wireless technologies such as WiFi and Bluetooth, both of which operate in the 2.4 GHz spectrum. As the number of passengers using wireless technologies increases, and as the density of passengers on aircraft increases, the saturation of those spaces with radio waves will likely only increase.

DETAILED DESCRIPTION

Figure 1:
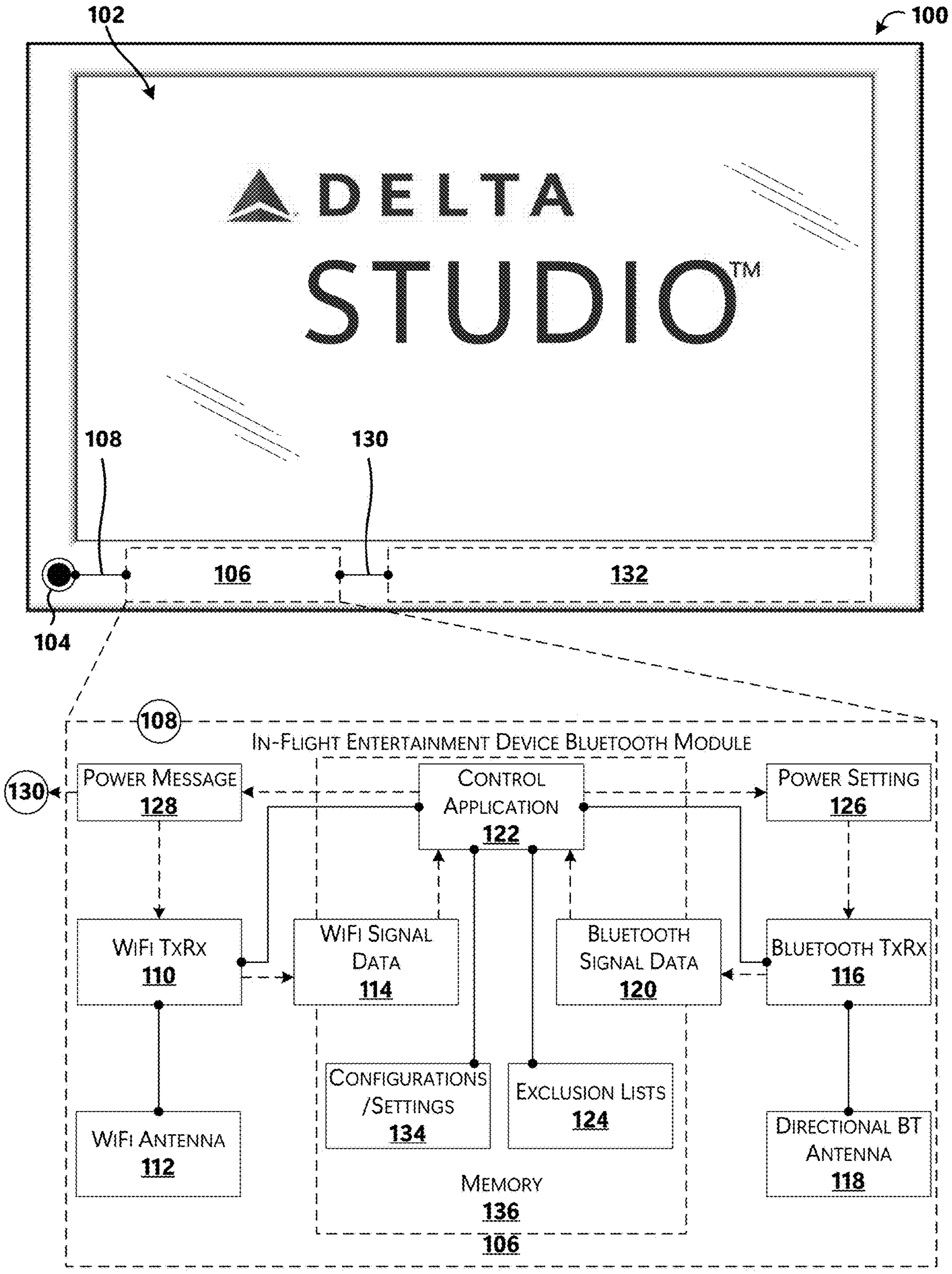
FIG. 1 is a system diagram illustrating an illustrative in-flight entertainment system, according to an example embodiment of the concepts and technologies described herein.

In the following detailed description, references are made to the accompanying drawings that form a part hereof and that show, by way of illustration, specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The words "illustrative" and "example," as used in the specification, are used expansively to refer to embodiments that serve as an illustration, specimen, model, sample, or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of in-flight entertainment device Bluetooth module will be described.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring first to FIG. 1, an in-flight entertainment device 100 is shown, according to an example embodiment of the concepts and technologies disclosed herein. As is generally understood, in-flight entertainment devices 100 can be included in or in proximity to an aircraft seat (e.g., in the rear of an aircraft seat, on a wall of an aircraft in front of an aircraft seat, on a pole or other extendible or rotatable structure stored under or near an aircraft seat, in an aircraft seat armrest, or elsewhere). In-flight entertainment devices 100 can include libraries of content such as, for example, movies, audio, news, messaging applications, service call features, advertisements, product catalogs, magazines, menus, games, maps, flight-tracking software, other applications, other media and/or software, combinations thereof, or the like. Because the media, other content, services, and features provided by in-flight entertainment devices 100 are generally understood, and because the content, services, and features of in-flight entertainment devices 100 can evolve and can change rapidly, these aspects of in-flight entertainment devices 100 will not be illustrated and described in additional detail here.

As is also generally understood, the in-flight entertainment device 100 can include a display 102 for displaying the content and/or other visual information for airline passengers. As can be seen on the in-flight entertainment device 100 illustrated in FIG. 1, the in-flight entertainment device 100 also can include an audio output jack or port such as a cable port and/or headphone jack (hereinafter referred to as a "headphone jack") 104. In various embodiments of the concepts and technologies disclosed herein, the headphone jack 104 can correspond to a 3.5 mm headphone jack or the like, though other interfaces are possible and are contemplated. It can be appreciated that the headphone jack 104 can be located in additional and/or alternative locations on the in-flight entertainment device 100 or elsewhere (e.g., in an armrest or the like) and may not be visible and/or included on the in-flight entertainment device 100 in all embodiments. As such, the example embodiment of the in-flight entertainment device 100 should be understood as being illustrative and should not be construed as being limiting in any way.

According to various embodiments of the concepts and technologies disclosed herein, the in-flight entertainment device 100 can be configured to include an in-flight entertainment device Bluetooth module 106. According to various embodiments of the concepts and technologies disclosed herein, the in-flight entertainment device Bluetooth module 106 can be configured to be retrofitted to the in-flight entertainment device 100. Thus, for example, the in-flight entertainment device 100 may be opened and the in-flight entertainment device Bluetooth module 106 may be connected to the in-flight entertainment device 100 and/or various components thereof. In some embodiments of the concepts and technologies disclosed herein, firmware of the in-flight entertainment device 100 may be updated to support the in-flight entertainment device Bluetooth module 106, but such retrofitting may be straightforward, cheap, and effective in various embodiments of the concepts and technologies disclosed herein. It should be understood that this example embodiment is illustrative, and therefore should not be construed as being limiting in any way.

In some other embodiments of the concepts and technologies disclosed herein, the in-flight entertainment device Bluetooth module 106 can be built into the in-flight entertainment device 100 instead of being retrofitted to the in-flight entertainment device 100. In yet other embodiments of the concepts and technologies disclosed herein, the in-flight entertainment device Bluetooth module 106 can be connected to the in-flight entertainment device 100, but may not necessarily be included in and/or retrofitted into the in-flight entertainment device 100.

According to various embodiments, as shown in FIG. 1, the in-flight entertainment device Bluetooth module 106 can connect to the in-flight entertainment device 100 and/or the headphone jack 104 or other audio output device via an interface or bus (hereinafter referred to as an "interface") 108. This is not necessarily the case in all embodiments, as will be explained herein. Because the in-flight entertainment device Bluetooth module 106 can connect to and/or communicate with various components of the in-flight entertainment device 100 in various other manners, it should be understood that the example embodiment including the interface 108 with the headphone jack 104 is illustrative, and therefore should not be construed as being limiting in any way.

As shown in FIG. 1, the in-flight entertainment device Bluetooth module 106 can include a wireless networking chip or device such as, for example, a WiFi transceiver 110 (labeled "WiFi TxRx 110" in FIG. 1). The WiFi transceiver 110 can be configured to receive and/or transmit wireless signals such as WiFi signals via a WiFi antenna 112. Of course, some embodiments of WiFi chips include both the WiFi transceiver 110 and the WiFi antenna 112, so the illustrated embodiment should be understood as being illustrative but not limiting.

As will be explained in more detail herein, the WiFi transceiver 110 can be replaced, in some embodiments, with a WiFi receiver, which can be configured to receive WiFi signals via the WiFi antenna 112 (but not to send WiFi signals). In some other embodiments, the WiFi transceiver 110 may be replaced by a WiFi receiver and a WiFi transmitter. In any event, various embodiments of the concepts and technologies disclosed herein include the in-flight entertainment device Bluetooth module 106 including components that can at least receive WiFi signals and, optionally, to transmit WiFi signals such as the embodiment illustrated in FIG. 1. It should be understood that these example embodiments are illustrative, and therefore should not be construed as being limiting in any way.

The WiFi transceiver 110 can be configured to detect WiFi signals in an immediate environment as sensed by the WiFi antenna 112. For example, the immediate environment can include a particular passenger seat, a wall, an area of an aircraft, and/or other locations or areas of an aircraft. The detecting of WiFi signals can be performed continuously by the WiFi transceiver 110, on demand, at set time intervals, and/or at other times and/or under other circumstances.

According to various embodiments of the concepts and technologies disclosed herein, the WiFi transceiver 110 can be configured to output WiFi signal data 114. The WiFi signal data 114 can correspond, in various embodiments, to the detected WiFi signals as detected by the WiFi transceiver 110 via the WiFi antenna 112. The WiFi signal data 114 can therefore correspond to detected WiFi signal saturation and/or congestion, what WiFi channel the WiFi transceiver 110 is connected to, what WiFi channels are detected, combinations thereof, or the like.

It should be appreciated that in some embodiments, WiFi signal data 114 may not be generated as such. Rather, the WiFi transceiver 110 may output signals that can be interpreted and/or converted into the WiFi signal data 114 by other entities shown in FIG. 1. It also should be understood that other entities shown in FIG. 1 can monitor the operation of the WiFi transceiver 110 and therefore may not receive or obtain any sort of data per se, instead receiving a signal and/or accessing the WiFi transceiver 110 to determine its state at any particular time. As such, it should be understood that the illustrated embodiment is illustrative and should not be construed as being limiting in any way. The above-mentioned and other functions associated with the WiFi transceiver 110 will be illustrated and described in more detail hereinbelow after introducing other components of the in-flight entertainment device Bluetooth module 106.

As shown in FIG. 1, the in-flight entertainment device Bluetooth module 106 also can include one or more short-range wireless networking chips or devices such as, for example, a Bluetooth transceiver 116 (labeled "Bluetooth TxRx 116" in FIG. 1). The Bluetooth transceiver 116 can be configured to receive and/or transmit wireless signals such as Bluetooth signals via a directional Bluetooth antenna 118. According to various embodiments of the concepts and technologies disclosed herein, the directional Bluetooth antenna 118 can be configured to emit Bluetooth signals (when transmitting) in a particular direction such as, for example, at a passenger seat directly facing the in-flight entertainment device 100 and in immediate proximity to the in-flight entertainment device 100. It should be understood that these example embodiments are illustrative, and therefore should not be construed as being limiting in any way.

According to various embodiments of the concepts and technologies disclosed herein, the directional Bluetooth antenna 118 can be configured to emit signals across a defined angle such as, for example, five degrees, ten degrees, fifteen degrees, twenty degrees, twenty-five degrees, and/or other angles ranging from about ten degrees up to about sixty degrees in one, two, and/or all directions from a center point of the directional Bluetooth antenna 118. Thus, instead of typical Bluetooth antennas, which omit Bluetooth signals omnidirectionally, embodiments of the directional Bluetooth antenna 118 illustrated and described herein can limit the emitting of signals to a particular direction and/or range of directions. It should be understood that this example embodiment is illustrative, and therefore should not be construed as being limiting in any way.

According to some embodiments of the concepts and technologies disclosed herein, the center point of the directional Bluetooth antenna 118 can be located such that the center point of the directional Bluetooth antenna 118 can be located in the rear of a first aircraft seat, and directly in front of and facing a passenger in a second aircraft seat directly behind the first aircraft seat. The coverage angle(s) of the directional Bluetooth antenna 118 can be set such that neighboring passengers' Bluetooth signals are not interfered with (and/or at least to minimize such interference) by the Bluetooth signals emitted by the in-flight entertainment device Bluetooth module 106. It should be understood that these example embodiments are illustrative, and therefore should not be construed as being limiting in any way.

In addition to supporting peer-to-peer communications with a device (e.g., a passenger's user device that has been paired with the in-flight entertainment device 100), the Bluetooth transceiver 116 can also be configured to detect Bluetooth signals in an immediate environment (e.g., at a particular aircraft passenger seat, at a wall facing an aircraft passenger seat, or other locations). This Bluetooth signal detection can be performed continuously by the Bluetooth transceiver 116, on demand, at set time intervals, and/or at other times and/or under other circumstances. According to various embodiments of the concepts and technologies disclosed herein, the Bluetooth transceiver 116 can be configured to output Bluetooth signal data 120. The Bluetooth signal data 120 can correspond to the detected Bluetooth signals and/or data indicating what channel the Bluetooth transceiver 116 is connected to, how many and/or how often frequency hops have occurred during a session, session duration information, session signal quality information, combinations thereof, or the like. This information can be used for various purposes, as will be explained in more detail herein.

In some embodiments, the Bluetooth transceiver 116 may output a signal that can be interpreted and/or converted into the Bluetooth signal data 120 shown in FIG. 1. It also should be understood that other entities shown in FIG. 1 can monitor the operation of the Bluetooth transceiver 116 and therefore may or may not receive or obtain any sort of data per se, instead receiving a signal and/or accessing the Bluetooth transceiver 116 to determine its operating state at any particular time. As such, it should be understood that the illustrated embodiment of Bluetooth signal data 120 passing from the Bluetooth transceiver 116 to other entities is illustrative and should not be construed as being limiting in any way. The above-mentioned and other functions associated with the Bluetooth transceiver 116 will be illustrated and described in more detail hereinbelow after introducing other components of the in-flight entertainment device Bluetooth module 106.

As shown in FIG. 1, the in-flight entertainment device Bluetooth module 106 also can include a controller or other device or entity that can control the functions of the in-flight entertainment device Bluetooth module 106. In the illustrated embodiment, the functionality of a controller can be provided by a control application 122. It should be understood that this embodiment is illustrative and should not be construed as being limiting in any way, as other entities (e.g., a firmware, other applications at other locations, other entities, or the like) can control the functions of the in-flight entertainment device Bluetooth module 106 in some embodiments. The functionality of the control application 122 and the various components of the in-flight entertainment device Bluetooth module 106 will now be explained in more detail.

According to various embodiments of the concepts and technologies disclosed herein, the control application 122 can be configured to control the overall function of the in-flight entertainment device Bluetooth module 106 including, for example, activating and/or deactivating the WiFi transceiver 110; activating and/or deactivating the Bluetooth transceiver 116; obtaining audio signals from the in-flight entertainment device 100 (e.g., from the headphone jack 104 and/or other audio output device or entity); transmitting the audio via the Bluetooth transceiver 116; analyzing and/or using the WiFi signal data 114 and/or the Bluetooth signal data 120; controlling, aiming, and/or focusing the directional Bluetooth antenna 118; adjusting a transmission power level associated with the Bluetooth transceiver 116; communicating transmission power levels and/or transmission power level settings associated with the Bluetooth transceiver 116 to the in-flight entertainment device 100 and/or other devices; combinations thereof; or the like. Because other functions will be illustrated and described herein, it should be understood that these example functions are illustrative, and therefore should not be construed as being limiting in any way.

According to various embodiments of the concepts and technologies disclosed herein, the control application 122 can be configured to detect audio signals, for example, via the interface 108 with the headphone jack 104 and/or via other interfaces. Additionally, and/or alternatively, the control application 122 can be configured to detect a connection (e.g., with a user device or the like). It can be appreciated that the in-flight entertainment device Bluetooth module 106 can be configured to be discoverable by other Bluetooth-enabled devices such as user devices, wireless headphones, or the like. Thus, the in-flight entertainment device Bluetooth module 106 can be configured to detect a connection with a Bluetooth-enabled device such as headphones, and to trigger various operations in response to detecting the connection.

In particular, after detecting a connection with a device and/or the initialization of a session between a Bluetooth-enabled device and the in-flight entertainment device Bluetooth module 106, the control application 122 can be configured to activate or trigger activation of the WiFi transceiver 110 to perform a WiFi signal scan or survey. The WiFi transceiver 110 can effectively perform a WiFi signal scan or survey to determine what WiFi signals exist and/or are detected at the WiFi antenna 112 at any particular time. Thus, upon being activated by the control application 122, the WiFi transceiver 110 can perform a WiFi signal survey and/or signal scan to detect what frequencies of WiFi are in use in proximity to the in-flight entertainment device Bluetooth module 106, a degree of WiFi signal saturation at the in-flight entertainment device Bluetooth module 106, and the like. It can be appreciated that WiFi signals can have a range of about one hundred fifty feet (if using 2.4 GHz frequencies), and therefore the signals detected in the WiFi signal scan by the WiFi transceiver 110 could be emitted from various devices throughout the aircraft. As such, measuring WiFi saturation and/or congestion at any particular location and/or time may be more valuable in some instances. At any rate, the WiFi transceiver 110 can perform the WiFi signal scan and identify one or more WiFi signals being used. It should be understood that this example embodiment is illustrative, and therefore should not be construed as being limiting in any way.

Based on the WiFi signals and/or WiFi signal information collected via the WiFi antenna 112, the WiFi transceiver 110 can determine channels associated with the WiFi signals and detect and/or identify a most-congested and/or most-used WiFi channel in the proximity of the in-flight entertainment device Bluetooth module 106. As is generally understood, WiFi-enabled systems operating on the IEEE 802.11 g/n/ax standards can be configured (in the United States) to employ three WiFi channels of 20 MHz each, separated by a guard band of about five MHz to attempt to reduce interference and/or collisions. Thus, the WiFi transceiver 110 can detect WiFi signals that are detectable by the WiFi antenna 112 and determine, based on the signals detected, which of the three WiFi channels is most-used and/or most-congested (e.g., which channel has the most traffic and/or congestion at that time). It should be understood that this example embodiment is illustrative, and therefore should not be construed as being limiting in any way.

For the most-congested (or most used) WiFi channel, the control application 122 can identify the corresponding Bluetooth channels. In particular, as is generally understood, Bluetooth-enabled devices may operate on any of seventy-nine channels of 1 MHz each across the same 2.4 GHz spectrum used for WiFi. In the case of Bluetooth, however, channels across the guard bands referenced above can also be used. At any rate, approximately twenty Bluetooth channels can correspond (in terms of frequency) to a particular WiFi channel. It should be understood that this example embodiment is illustrative, and therefore should not be construed as being limiting in any way.

The control application 122 can be configured to identify the Bluetooth channels corresponding to the most-used or most-congested WiFi channel. The control application 122 also can be configured to determine if the corresponding identified Bluetooth channels are already on an exclusion list 124. According to various embodiments of the concepts and technologies disclosed herein, the Bluetooth transceiver 116 may select a Bluetooth channel from any of the available seventy-nine channels other than those channels listed at any particular time on the exclusion list 124. Thus, for example, if the Bluetooth transceiver 116 detects a collision and/or interference with other signals from other Bluetooth-enabled devices, frequency hopping can be selectively controlled to exclude certain frequencies (e.g., Bluetooth channels) that are already utilized by nearby devices and/or found on an exclusion list 124. It should be understood that this example embodiment is illustrative, and therefore should not be construed as being limiting in any way.

In particular, as will be explained in more detail below with reference to FIGS. 2A-2E, embodiments of the concepts and technologies disclosed herein can detect a most-used or most-congested WiFi channel and assume, based on that detection, that a nearest aircraft access point is operating on the detected most-used or most-congested WiFi channel. In some embodiments, this assumption can be based on a design guideline that neighboring access points located in an aircraft will operate on different channels to minimize or at least reduce signal interference. It should be understood that this example embodiment is illustrative, and therefore should not be construed as being limiting in any way.

The control application 122 can determine if the identified Bluetooth channels are included in an exclusion list 124 (and therefore not available for use by the Bluetooth transceiver 116). If the control application 122 determines that the identified Bluetooth channels are already included in the exclusion list 124, a timer job can be started (e.g., a time set to a set time interval) and after the timer job expires, the scan for WiFi signals can be performed again. Alternatively, the control application 122 may wait until congestion is detected, or for a command to again scan for WiFi signals (instead of using a timer job). A command to perform a WiFi signal scan can come from other devices and/or may be prompted by detecting connection of a device to the in-flight entertainment device Bluetooth module 106. Thus, it can be appreciated that the WiFi signal scan or survey, identification of the most-congested and/or most-used WiFi channel, and identification and exclusion of the corresponding Bluetooth channels can be iterated from time to time by the control application 122 while the connection and/or Bluetooth session persists. It should be understood that this example embodiment is illustrative, and therefore should not be construed as being limiting in any way.

If the control application 122 determines that the identified Bluetooth channels are not already included in the exclusion list 124, the control application 122 can add the identified Bluetooth channels to the exclusion list 124. As noted above, when the Bluetooth transceiver 116 selects and/or hops to another frequency (e.g., as part of active frequency hopping to avoid collisions and/or interference), the Bluetooth transceiver 116 can avoid channels included in the exclusion list 124. If the session and/or connection is still ongoing after the Bluetooth channels have been added to the exclusion list 124, the scan for WiFi signals can be performed again (immediately, after a timer, and/or after a command is received as explained herein). Thus, it can be appreciated that the signal survey, identification of the most-congested and/or most-used WiFi channel, and identification and exclusion of the corresponding Bluetooth channels can be iterated by the control application 122 while the connection and/or Bluetooth session persists. It should be understood that this example embodiment is illustrative, and therefore should not be construed as being limiting in any way.

According to additional embodiments of the concepts and technologies disclosed herein, the transmission power level of the Bluetooth transceiver 116 may be reduced (below the baseline and/or maximum transmission power level) by design to decrease and/or avoid interference. In some other embodiments, the control application 122 can be configured to actively and/or dynamically control transmission power level of the Bluetooth transceiver 116. In particular, the control application 122 can be configured to detect a connection and/or a session with a Bluetooth-enabled device such as wireless headphones, or the like. At some point during the Bluetooth session, the control application 122 can detect Bluetooth congestion. It can be appreciated that the control application 122 can detect the Bluetooth congestion by analyzing the Bluetooth signal data 120, by determining what channel the Bluetooth transceiver 116 is transmitting on, by detecting one or more frequency hop operations (which may occur due to unexpected congestion and/or collisions in some embodiments), combinations thereof, or the like.

When Bluetooth congestion is detected, the control application 122 can determine a transmission power level of the Bluetooth transceiver 116. In some embodiments, the control application 122 can determine the transmission power level of the Bluetooth transceiver 116 by analyzing the Bluetooth signal data 120 (e.g., the transmission power level and utilized channel can be included in the Bluetooth signal data 120 in some embodiments). In some other embodiments, the Bluetooth transceiver 116 can be polled or monitored by the control application 122 and the Bluetooth transceiver 116 can report the transmission power level and utilized channel information to the control application 122. In any event, the control application 122 can be configured to determine the transmission power level of the Bluetooth transceiver 116 and the Bluetooth channel being used.

The control application 122 can determine, based on the transmission power level, if the output power of the Bluetooth transceiver 116 is at a defined minimum output level. According to some embodiments of the concepts and technologies disclosed herein, the output power of the Bluetooth transceiver 116 can by default be set to negative six decibels (−6 dB) or other sub-baseline transmission power levels (e.g., negative three decibels (−3 dB), or the like) to reduce range of the Bluetooth transceiver 116 and thereby to reduce congestion throughout the aircraft.

In some other embodiments, the transmission power level can be set to a baseline transmission power (e.g., zero decibels (0 dB)) and adjusted by the control application 122 as illustrated and described herein. It should be understood that proactively reducing transmission power can be useful to avoid interference in some embodiments, but may negatively impact performance (e.g., clarity) of the Bluetooth devices such as the in-flight entertainment device Bluetooth module 106. As such, some embodiments of the concepts and technologies disclosed herein utilize dynamic power throttling as illustrated and described herein. It should be understood that this example embodiment is illustrative, and therefore should not be construed as being limiting in any way.

In embodiments that include the dynamic changing of transmission power levels of the Bluetooth transceiver 116, if the control application 122 determines that the output power is set to the minimum allowed (e.g., negative six decibels in some embodiments), the control application 122 can reset the Bluetooth connection or take other remedial actions (e.g., make the Bluetooth connectivity unavailable for some time interval, require the device to reconnect, or the like) in an attempt to mitigate the interference. It should be understood that this example embodiment is illustrative, and therefore should not be construed as being limiting in any way.

If the control application 122 determines that the output power is not set to the minimum allowed (e.g., negative six decibels in some embodiments), the control application 122 can issue a command to reduce the transmission power level. In some embodiments, the control application 122 can issue a power setting 126 to the Bluetooth transceiver 116 to reduce the transmission power level and/or instruct other devices or entities to reduce the output power of the Bluetooth transceiver 116. It should be understood that this example embodiment is illustrative, and therefore should not be construed as being limiting in any way.

In some embodiments of the concepts and technologies disclosed herein, the control application 122 also can be configured to propagate a power message 128 to other devices on the aircraft and/or to other components of the in-flight entertainment device 100. In some embodiments, the power message 128 can be delivered via another interface 130 to other hardware 132 of the in-flight entertainment device 100, and from there the power message 128 may be propagated to other in-flight entertainment devices 100, network controllers, or other entities or devices. In some embodiments, the power message 128 can be propagated via wired and/or wireless connections to instruct other in-flight entertainment device Bluetooth modules 106 on the aircraft to reduce their transmission power (e.g., in an attempt to reduce interference). It should be understood that this example embodiment is illustrative, and therefore should not be construed as being limiting in any way.

In some other embodiments, the power message 128 can also be delivered to the other in-flight entertainment device Bluetooth modules 106 on the aircraft via WiFi, for example via the WiFi transceiver 110. Similarly, it can be appreciated that the in-flight entertainment device Bluetooth module 106 may be configured to receive power messages 128 from other in-flight entertainment device Bluetooth modules 106 via the interface 130 and/or via the WiFi transceiver 110. In any event, the in-flight entertainment device Bluetooth module 106 can be configured to use the power message 128 to reduce the transmission power of the Bluetooth transceiver 116 in some instances. It should be understood that this example embodiment is illustrative, and therefore should not be construed as being limiting in any way.

The control application 122 can determine, after adjusting the transmission power level and/or propagating the power message 128, if the Bluetooth session and/or connection is still ongoing. If the control application 122 determines that the Bluetooth session and/or connection is still ongoing, the control application 122 can wait until Bluetooth congestion is again detected. Thus, it can be appreciated that the congestion detection, determination of transmission power level, adjustment of transmission power level, and/or propagation of the power message 128 can be iterated by the control application 122 while the connection and/or Bluetooth session persists. It should be understood that this example embodiment is illustrative, and therefore should not be construed as being limiting in any way.

According to various embodiments of the concepts and technologies disclosed herein, the in-flight entertainment device Bluetooth module 106 also can be configured to store configurations and/or settings 134 (labeled "configurations/settings" in FIG. 1), for example in a memory 136 that also can store the control application 122 and the exclusion lists 124, as well as other information illustrated and described herein. The configurations and/or settings 134 can define, for the in-flight entertainment device Bluetooth module 106, time intervals to be used as illustrated and described herein, channel identifiers and/or other information that may be used as illustrated and described herein, minimum power transmission levels as illustrated and described herein, maximum power transmission levels that can be used, identifying information of the in-flight entertainment device Bluetooth module 106 (e.g., what seat or passenger the in-flight entertainment device Bluetooth module 106 is associated with), and/or other information. The memory 136 also can support a cache for temporarily or permanently storing data such as, for example, the WiFi signal data 114, Bluetooth signal data 120, other data, or the like. It should be understood that this example embodiment is illustrative, and therefore should not be construed as being limiting in any way.

Figure 2A:
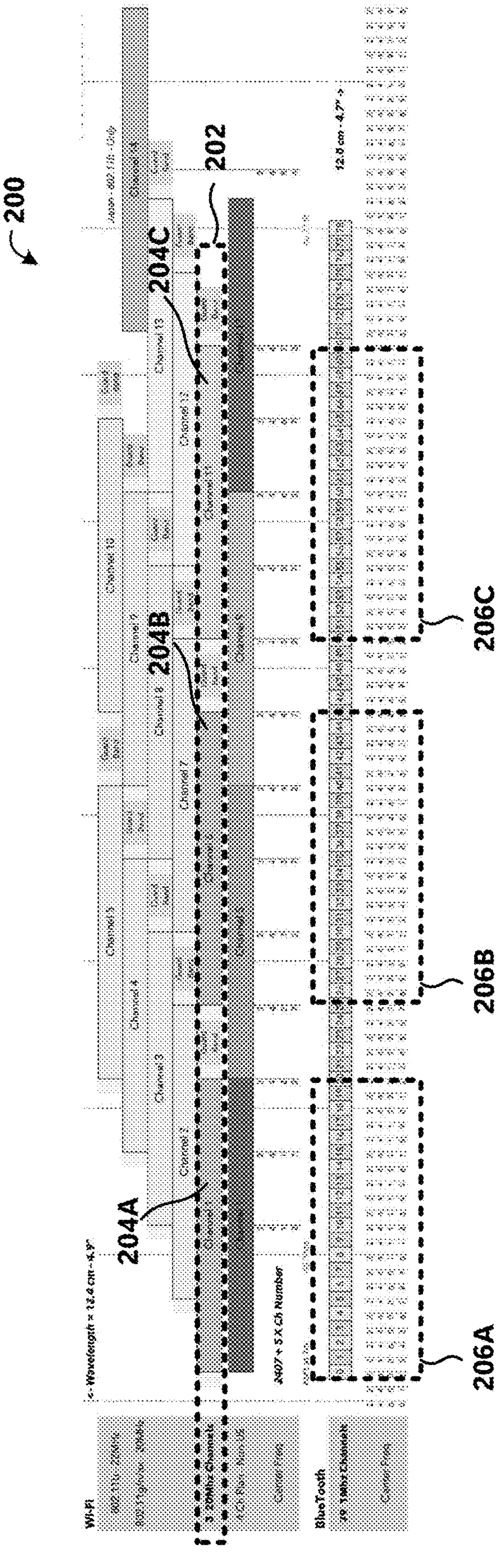
FIG. 2A illustrates aspects of WiFi and Bluetooth frequencies, as well as some aspects of frequency channel selection and excluding frequencies, according to an example embodiment of the concepts and technologies disclosed herein.

Turning now to FIG. 2A, additional aspects of the concepts and technologies disclosed herein will be illustrated and described in detail. In particular, FIG. 2A illustrates aspects of frequency channel selection and exclusion lists 124, according to an example embodiment of the concepts and technologies disclosed herein. In particular, FIG. 2A illustrates a spectrum chart 200 showing allocation of WiFi and Bluetooth channels across the 2.4 GHz spectrum. It should be understood that this example embodiment is illustrative, and therefore should not be construed as being limiting in any way.

According to various embodiments of the concepts and technologies disclosed herein, the 2.4 GHz spectrum used in the United States for WiFi and Bluetooth signals can range from 2.4 GHz (i.e., 2400 MHz) to 2.481 GHz (2481 MHz). Some other countries may use additional spectrum (e.g., Japan, in which WiFi using the IEEE 802.11b standard can use spectrum up to 2495 MHz), but for purposes of illustrating and describing the concepts and technologies disclosed herein, the three channels used in the United States will be assumed. It should be understood that this example embodiment is illustrative, and therefore should not be construed as being limiting in any way.

As indicated generally at reference number 202 in FIG. 2A, a spectrum allocation scheme for WiFi as used by embodiments of the concepts and technologies disclosed herein can include three twenty megahertz (20 MHz) channels offset by one another by five megahertz (5 MHz) to reduce interference. Thus, the WiFi channels used in accordance with various embodiments of the concepts and technologies disclosed herein can include a first channel 204A (Channel 1), which can cover frequencies from 2.402 GHz (2402 MHz) to 2.422 GHz (2422 MHz); a second channel 204B (Channel 6), which can cover frequencies from 2.427 GHz (2427 MHz) to 2.447 GHZ (2447 MHz); and a third channel 204C (Channel 11), which can cover frequencies from 2.452 GHz (2452 MHz) to 2.472 GHZ (2472 MHz). It should be understood that this example embodiment is illustrative, and therefore should not be construed as being limiting in any way.

As can be appreciated with reference to FIG. 2A, a spectrum allocation scheme for Bluetooth for embodiments of the concepts and technologies disclosed herein can include seventy-nine one megahertz (1 MHz) channels. Thus, the Bluetooth channels for purposes of embodiments of the concepts and technologies disclosed herein, can be divided into three groups of Bluetooth channels 206A-C (hereinafter collectively and/or generically referred to as "groups of Bluetooth channels 206"). In particular, the Bluetooth channels used in accordance with various embodiments of the concepts and technologies disclosed herein can include a first group of Bluetooth channels 206A (Channels zero through nineteen (0-19)), with center frequencies of the respective channels ranging from 2.402 GHz (2402 MHz) to 2.422 GHz (2422 MHz); a second group of Bluetooth channels 206B (Channels twenty six through forty five (26-45)), with center frequencies of the respective channels ranging from 2.427 GHz (2427 MHz) to 2.447 GHz (2447 MHz); and a third group of Bluetooth channels 206C (Channels fifty through sixty nine (50-69)), with center frequencies of the respective channels ranging from 2.452 GHz (2452 MHz) to 2.472 GHz (2472 MHz). In some embodiments of the concepts and technologies disclosed herein, the other Bluetooth channels that are not included in the groups of Bluetooth channels 206 can be excluded or may be used without exclusion. It should be understood that this example embodiment is illustrative, and therefore should not be construed as being limiting in any way.

According to embodiments of the concepts and technologies disclosed herein, an in-flight entertainment device Bluetooth module 106 can determine what WiFi channel is most-used or most-congested in the proximity of the in-flight entertainment device Bluetooth module 106. If, for example, the in-flight entertainment device Bluetooth module 106 determines that channel 1 (generally referred to in FIG. 2A with reference number 204A) is a most-used or most congested WiFi channel, the in-flight entertainment device Bluetooth module 106 can exclude, from use of the Bluetooth transceiver 116, the first group of Bluetooth channels 206A (Channels zero through nineteen (0-19)), with center frequencies of the respective channels ranging from 2.402 GHz (2402 MHz) to 2.422 GHz (2422 MHz). It should be understood that this example embodiment is illustrative, and therefore should not be construed as being limiting in any way.

It can be appreciated with reference to FIG. 2A that by avoiding use of these twenty channels that overlap the frequencies used by WiFi channel 1, the in-flight entertainment device Bluetooth module 106 can avoid congestion and/or collisions and/or noise that may result from simultaneous WiFi and Bluetooth communications occurring in the proximity of the in-flight entertainment device Bluetooth module 106 on the same frequencies. Similar exclusions can be performed as illustrated and described herein for other WiFi and Bluetooth channels. It should be understood that this example embodiment is illustrative, and therefore should not be construed as being limiting in any way.

Figure 2B:
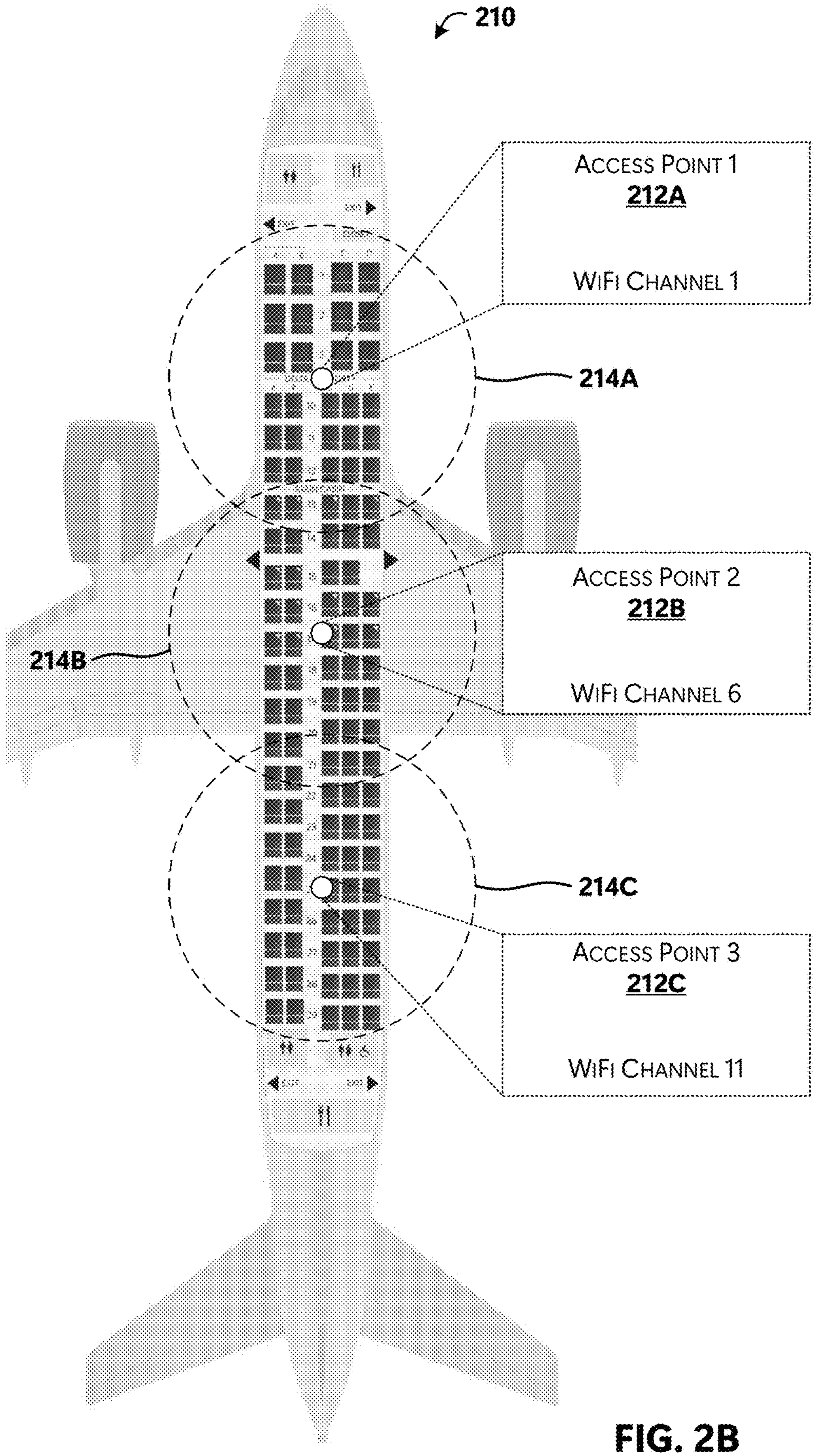
FIG. 2B illustrates various aspects of an example scheme for access point locating and WiFi channel selection for access points in an aircraft environment, according to an example embodiment of the concepts and technologies disclosed herein.

Turning now to FIG. 2B, additional aspects of the concepts and technologies disclosed herein will be illustrated and described in detail. In particular, FIG. 2B illustrates various aspects of an example scheme for WiFi access point locating and WiFi channel selection for those WiFi access points in an aircraft environment, according to an example embodiment of the concepts and technologies disclosed herein. As shown in FIG. 2B, an aircraft 210 can have WiFi hardware. In FIG. 2B, the aircraft 210 is illustrated as having three WiFi access points 212A-C (hereinafter collectively and/or generically referred to as "WiFi access points 212"), which can be distributed across the aircraft 210. It should be understood that any number of WiFi access points 212 can be included, and that the embodiment showing three WiFi access points 212 is merely illustrative of the concepts and technologies disclosed herein and therefore should not be construed as being limiting in any way.

As shown in FIG. 2B, the first WiFi access point 212A can be configured to operate using WiFi channel 1 and can be located at a first location. The first WiFi access point 212A can have a first effective communication range 214A. Although the first effective communication range 214A is illustrated as being substantially radial (centered on the first WiFi access point 212A), it can be appreciated that the aircraft walls can effectively terminate propagation of the WiFi signals in various embodiments. It should be understood that this example embodiment is illustrative, and therefore should not be construed as being limiting in any way.

Similarly, the second WiFi access point 212B can be configured to operate using WiFi channel 6 and can be located at a second location. The second WiFi access point 212B can have a second effective communication range 214B. Finally, the third WiFi access point 212C can be configured to operate using WiFi channel 11 and can be located at a third location. The third WiFi access point 212C can have a third effective communication range 214C. It can be appreciated with reference to FIG. 2B that there may be some overlap in terms of range of the respective WiFi access points 212, but this is not necessarily the case. It also can be appreciated that embodiments of the concepts and technologies disclosed herein can assign different channels to the WiFi access points 212 to attempt to reduce congestion of WiFi signals, in some embodiments. It should be understood that the example embodiment illustrated in FIG. 2B is illustrative, and therefore should not be construed as being limiting in any way.

Figure 2C:
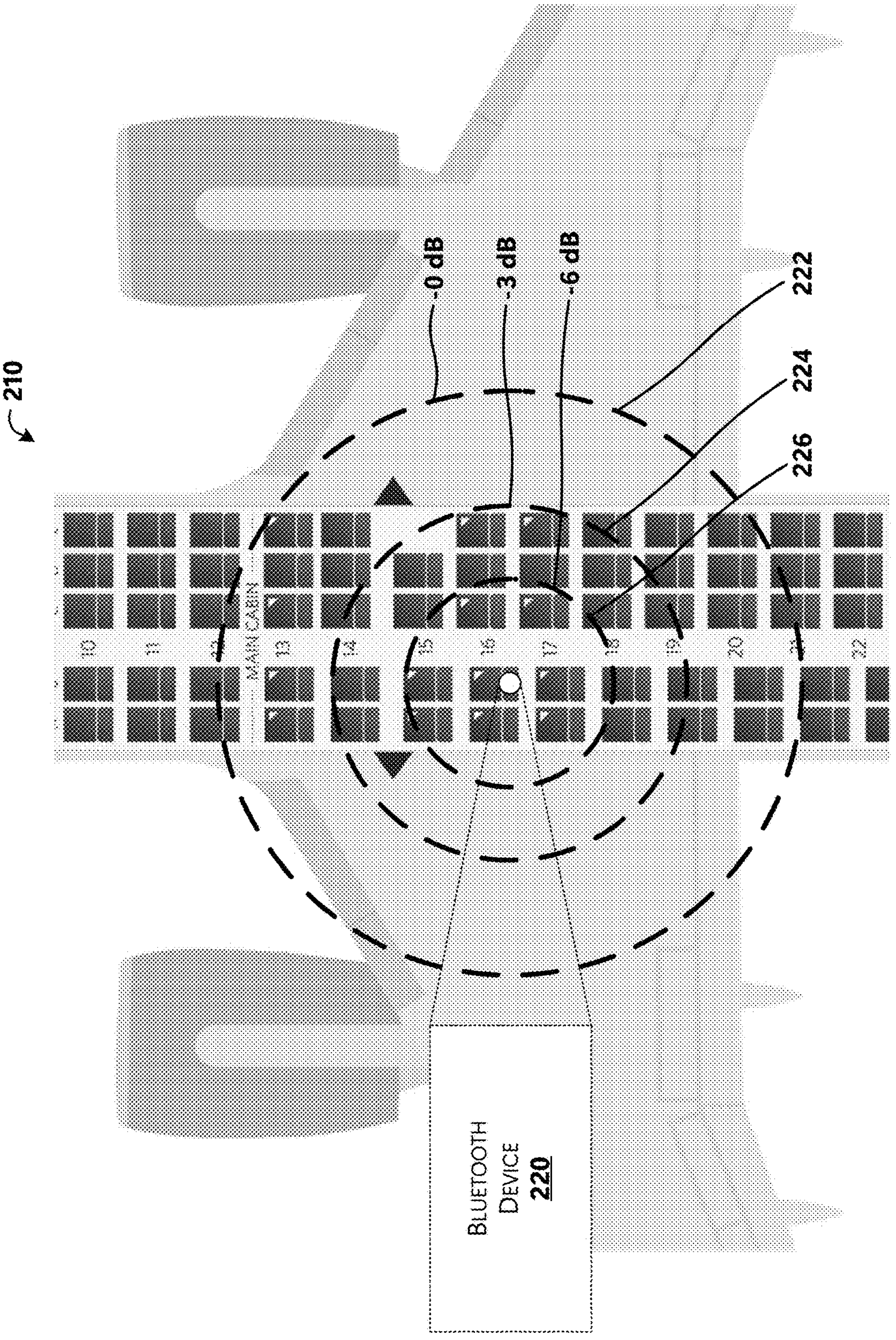
FIG. 2C illustrates aspects of Bluetooth signal range and/or falloff based on transmission power in an aircraft environment, according to an example embodiment of the concepts and technologies disclosed herein.

Turning now to FIG. 2C, additional aspects of the concepts and technologies disclosed herein will be illustrated and described in detail. In particular, FIG. 2C illustrates aspects of Bluetooth signal range and/or falloff based on transmission power, according to an example embodiment of the concepts and technologies disclosed herein. In particular, FIG. 2C illustrates a Bluetooth device 220 that includes a transceiver and an omnidirectional antenna. As can be seen in FIG. 2C, the Bluetooth device 220 can have a first effective communication range 222, which can correspond to a theoretical range of the Bluetooth device 220 if no adjustment to the power transmission level is made (e.g., the transmission power level is set at the device baseline and therefore is adjusted up or down by 0 dB). It should be understood that this example embodiment is illustrative, and therefore should not be construed as being limiting in any way.

Similarly, the Bluetooth device 220 can have a second effective communication range 224, which can correspond to a theoretical range of the Bluetooth device 220 if an adjustment of negative three decibels (−3 dB) is made to the power transmission level (e.g., the baseline transmission power level is reduced by 3 dB) as in some embodiments of the concepts and technologies disclosed herein. Still further, the Bluetooth device 220 can have a third effective communication range 226, which can correspond to a theoretical range of the Bluetooth device 220 if an adjustment of negative six decibels (−6 dB) is made to the power transmission level (e.g., the baseline transmission power level is reduced by 6 dB) as in some embodiments of the concepts and technologies disclosed herein. It should be understood that these example embodiments are illustrative, and therefore should not be construed as being limiting in any way.

Thus, it can be appreciated that with no adjustment to power transmit level, that signals from the Bluetooth device 220 may be received by approximately forty passengers; that with a three decibel reduction (i.e., −3 dB), that signals from the Bluetooth device 220 may be received by approximately twenty one passengers; and that with a six decibel reduction (i.e., −6 dB), that signals from the Bluetooth device 220 may be received by approximately eight passengers. Thus, it can be appreciated that a reduction in transmission power can reduce interference among passengers in some embodiments. It should be understood that this example embodiment is illustrative, and therefore should not be construed as being limiting in any way.

Figure 2D:
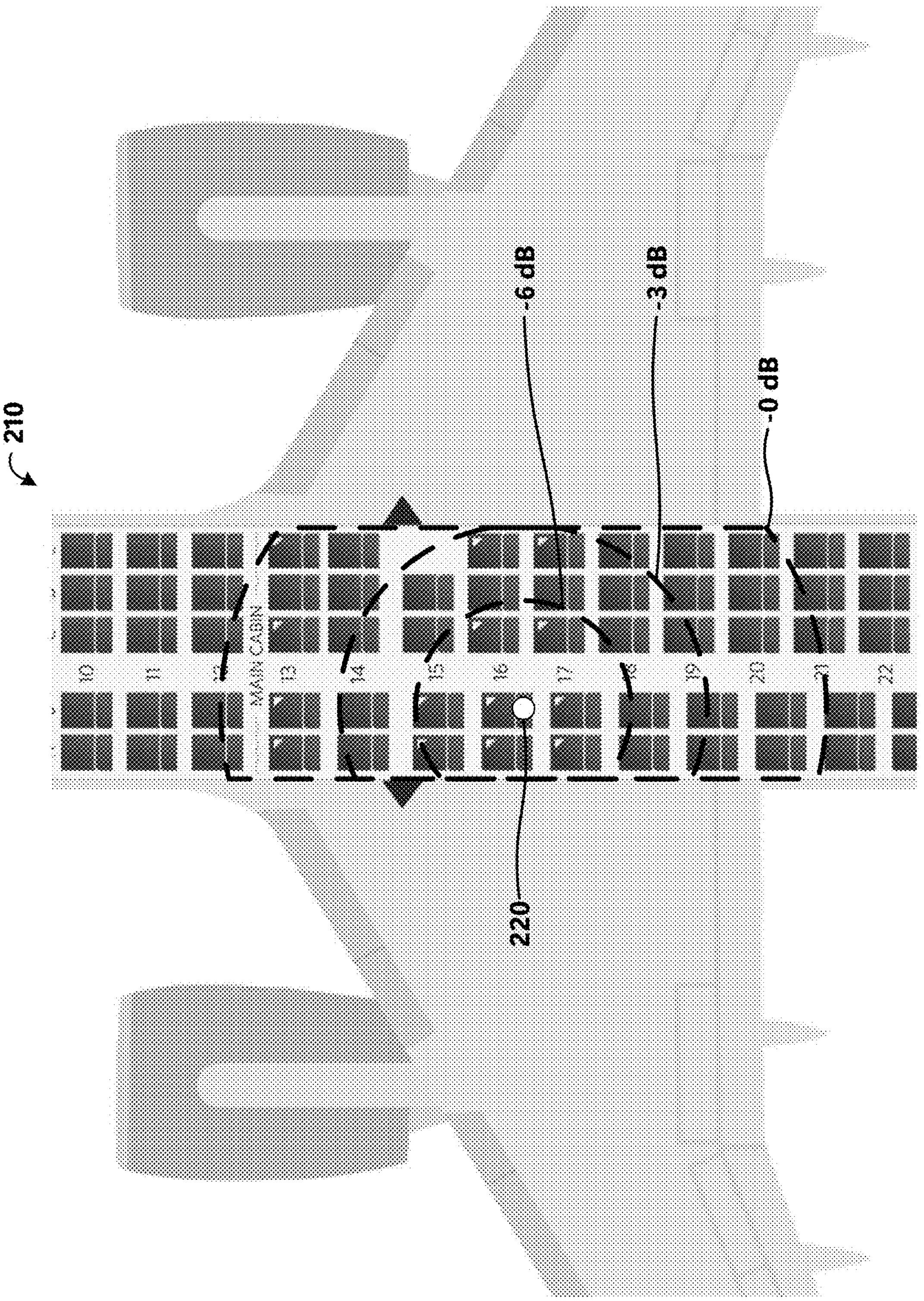
FIG. 2D illustrates additional aspects of Bluetooth signal range and/or falloff in an aircraft environment, according to an example embodiment of the concepts and technologies disclosed herein.

Turning now to FIG. 2D, additional aspects of the concepts and technologies disclosed herein will be illustrated and described in detail. In particular, FIG. 2D illustrates additional aspects of Bluetooth signal range and/or falloff in an aircraft environment, according to an example embodiment of the concepts and technologies disclosed herein. As can be seen in FIG. 2D, the walls of the aircraft can stop propagation of the Bluetooth signals in some embodiments, though this is not necessarily the case. Thus, it can be appreciated that in some embodiments of the concepts and technologies disclosed herein, the use of radiofrequency ("RF") shielding can be employed in the seat backs or elsewhere to further reduce the range of Bluetooth signals emitted by the in-flight entertainment device Bluetooth modules 106 as illustrated and described herein. FIG. 2D also illustrates how few passengers may receive Bluetooth signals form the Bluetooth device 220 due to the shape of the aircraft, and how even that relatively small number can be further reduced by reducing transmission power level as illustrated and described herein. It should be understood that this example embodiment is illustrative, and therefore should not be construed as being limiting in any way.

Figure 2E:
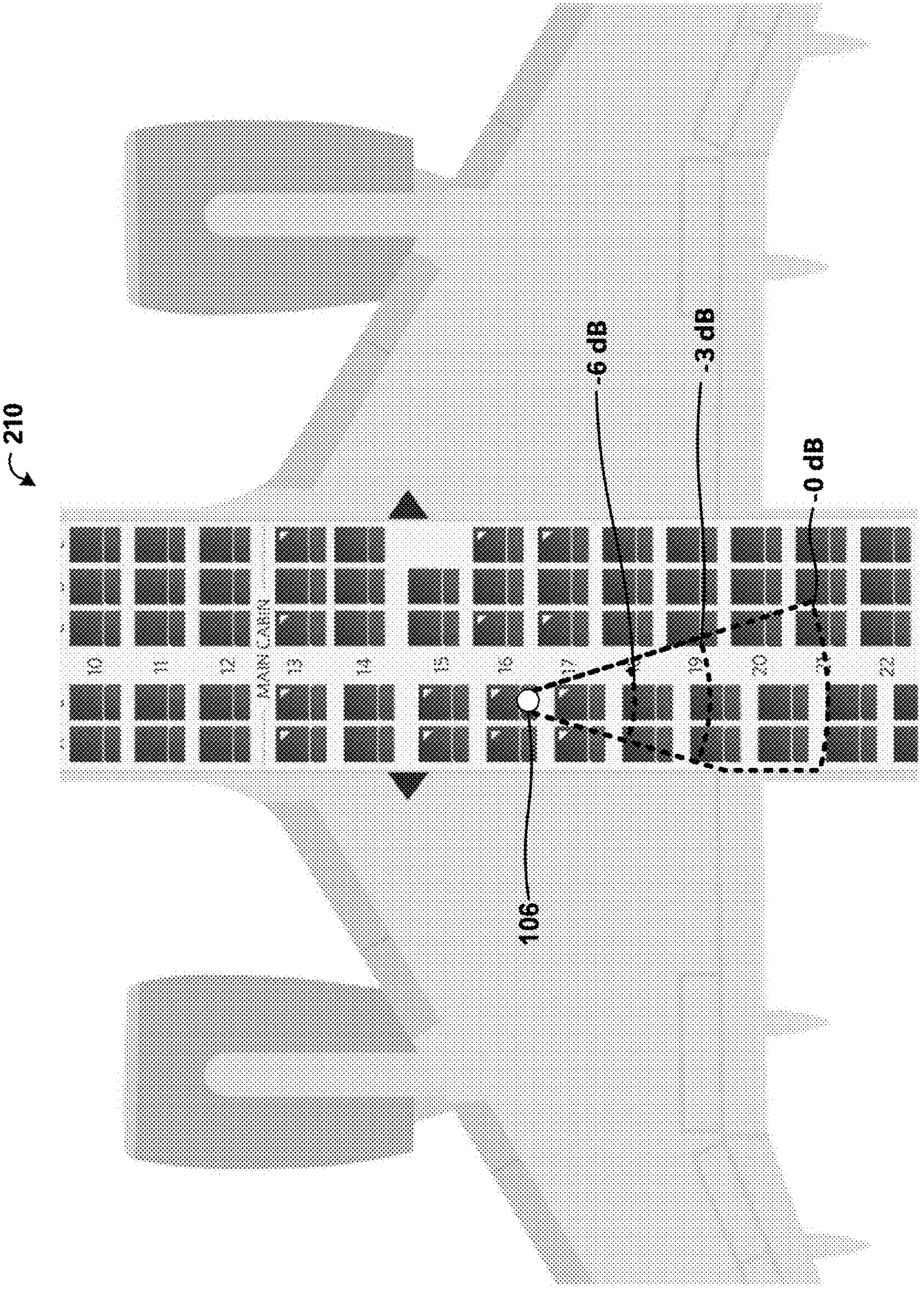
FIG. 2E illustrates an example embodiment of Bluetooth signal range and/or falloff in an aircraft environment using an embodiment of the in-flight entertainment device Bluetooth module illustrated and described herein, according to an example embodiment of the concepts and technologies disclosed herein.

Turning now to FIG. 2E, additional aspects of the concepts and technologies disclosed herein will be illustrated and described in detail. In particular, FIG. 2E illustrates an example embodiment of Bluetooth signal range and/or falloff in an aircraft environment using an embodiment of the in-flight entertainment device Bluetooth module 106 illustrated and described herein, according to an example embodiment of the concepts and technologies disclosed herein. In particular, as explained above with reference to FIG. 1, embodiments of the concepts and technologies disclosed herein can include a directional Bluetooth antenna 118, which can be employed in various embodiments of the concepts and technologies disclosed herein to further reduce the number of passengers that may experience interference due to Bluetooth signals emitted by the in-flight entertainment device Bluetooth module 106. It should be understood that this example embodiment shown in FIG. 2E is illustrative, and therefore should not be construed as being limiting in any way.

By using the directional Bluetooth antenna 118 and by reducing transmission power of the Bluetooth transceiver 116 (e.g., by negative six decibels (−6 dB)), some embodiments of the concepts and technologies disclosed herein can reduce the range and/or coverage of the Bluetooth signals emitted by the in-flight entertainment device Bluetooth module 106 such that only one passenger (i.e., the intended passenger) can receive the Bluetooth signals. By using the directional Bluetooth antenna 118 and by reducing transmission power of the Bluetooth transceiver 116 (e.g., by negative three decibels (−3 dB)), some embodiments of the concepts and technologies disclosed herein can reduce the range and/or coverage of the Bluetooth signals emitted by the in-flight entertainment device Bluetooth module 106 such that only two passengers (i.e., the intended passenger and a passenger directly behind that passenger) may receive the Bluetooth signals.

By using the directional Bluetooth antenna 118 without reducing transmission power of the Bluetooth transceiver 116, some embodiments of the concepts and technologies disclosed herein can reduce the range and/or coverage of the Bluetooth signals emitted by the in-flight entertainment device Bluetooth module 106 such that only five or six passengers may receive the Bluetooth signals. Such embodiments can avoid interference and/or may improve the effectiveness of other technologies such as active frequency hopping, thereby improving customer service and/or perceived performance of embodiments of the concepts and technologies disclosed herein. It should be understood that this example embodiment is illustrative, and therefore should not be construed as being limiting in any way.

Figure 3:
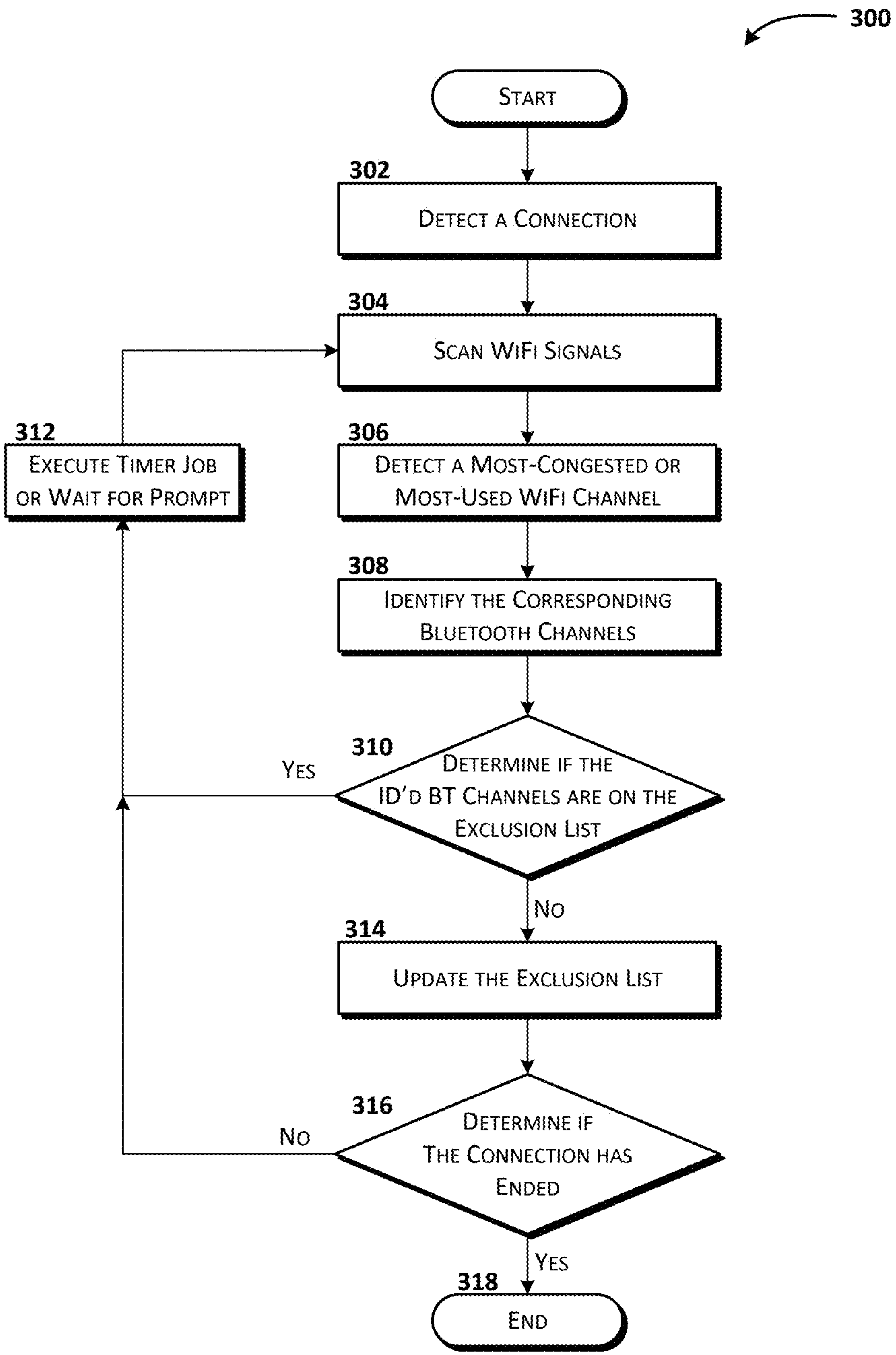
FIG. 3 is a flow diagram showing aspects of a method for adding Bluetooth channels to an exclusion list based on WiFi signals, according to an illustrative embodiment of the concepts and technologies described herein.

Turning now to FIG. 3, aspects of a method 300 for adding Bluetooth channels to an exclusion list 124 of an in-flight entertainment device Bluetooth module 106 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the in-flight entertainment device 100 and/or the in-flight entertainment device Bluetooth module 106 to perform one or more operations and/or causing the processor to direct other components of the computing system or device to perform one or more of the operations.

For purposes of illustrating and describing the concepts of the present disclosure, the method 300 is described herein as being performed by the in-flight entertainment device Bluetooth module 106 via execution of one or more software modules such as, for example, the control application 122. It should be understood that additional and/or alternative devices and/or network nodes can provide the functionality described herein via execution of one or more modules, applications, and/or other software including, but not limited to, the control application 122. Thus, the illustrated embodiments are illustrative, and should not be viewed as being limiting in any way.

The method 300 begins at operation 302. At operation 302, the in-flight entertainment device Bluetooth module 106 can detect a connection. The connection detected in operation 302 can correspond to a Bluetooth connection between the in-flight entertainment device Bluetooth module 106 and a consumer (e.g., passenger) device such as, for example, wireless headphones or earbuds of a passenger or crew, a user device of a passenger or crew, and/or some other Bluetooth-enabled device. According to various embodiments, including the example embodiment of the method 300 illustrated and described herein, the Bluetooth connection detected in operation 302 can correspond to a Bluetooth connection between the in-flight entertainment device Bluetooth module 106 and a Bluetooth-enabled audio device (e.g., headphones, earbuds, a speaker, or the like). It should be understood that this example embodiment is illustrative, and therefore should not be construed as being limiting in any way.

As such, operation 302 can correspond to the in-flight entertainment device Bluetooth module 106 detecting a state of the Bluetooth transceiver 116 and determining that an active connection exists between the Bluetooth transceiver 116 and an external Bluetooth-enabled audio device (e.g., via the directional Bluetooth antenna 118). In some other embodiments of the concepts and technologies disclosed herein, the in-flight entertainment device Bluetooth module 106 can perform operation 302 by analyzing Bluetooth signal data 120 (or other signals or state information) obtained from the Bluetooth transceiver 116 and/or monitored by the control application 122 or other entities, to determine that an audio device is connected to the in-flight entertainment device Bluetooth module 106. Because the connection can be detected in additional and/or alternative manners, it should be understood that these example embodiments are illustrative, and therefore should not be construed as being limiting in any way.

From operation 302, the method 300 can proceed to operation 304. At operation 304, the in-flight entertainment device Bluetooth module 106 can scan WiFi signals. According to various embodiments of the concepts and technologies disclosed herein, the in-flight entertainment device Bluetooth module 106 can perform operation 304 by activating the WiFi transceiver 110 and instructing the WiFi transceiver 110 to perform a scan or survey of WiFi signals detectable by the WiFi transceiver 110. In some other embodiments, the in-flight entertainment device Bluetooth module 106 can perform operation 304 by activating or triggering the activation of the WiFi transceiver 110, and the WiFi transceiver 110 may be configured to perform a scan or survey of WiFi signals detectable by the WiFi transceiver 110 when triggered or activated. In yet other embodiments, the WiFi transceiver 110 may periodically perform a scan or survey of WiFi signals and may generate or output WiFi signal data 114 that may be obtained in operation 304. Because the scanning of WiFi signals can be performed and/or triggered in additional and/or alternative manners, it should be understood that these example embodiments are illustrative, and therefore should not be construed as being limiting in any way.

From operation 304, the method 300 can proceed to operation 306. At operation 306, the in-flight entertainment device Bluetooth module 106 can detect, via the output from the scan or survey of WiFi signals triggered or performed in operation 304, a most-congested and/or most-used WiFi channel. It can be appreciated that in operation 306, the most-used and/or most-congested WiFi channel can be detected from the perspective of the in-flight entertainment device Bluetooth module 106 (e.g., at the perspective of the WiFi transceiver 110 and/or WiFi antenna 112 thereof). It should be understood that this example embodiment is illustrative, and therefore should not be construed as being limiting in any way.

Thus, operation 306 may not necessarily be directed to identifying the most-used and/or most-congested WiFi channel on the aircraft, but rather the most-used and/or most-congested WiFi channel in the proximity of the in-flight entertainment device Bluetooth module 106. It can be appreciated that if multiple in-flight entertainment device Bluetooth modules 106 on an aircraft perform operation 306 simultaneously at different areas of the aircraft, that the most-used and/or most-congested WiFi channel at those different areas of the aircraft may be the same and/or may be different (as illustrated and described above with reference to FIG. 2B). As such, various embodiments of the concepts and technologies disclosed herein can include the in-flight entertainment device Bluetooth modules 106 on the aircraft independently performing the analysis illustrated and described herein. It should be understood that these example embodiments are illustrative, and therefore should not be construed as being limiting in any way.

From operation 306, the method 300 can proceed to operation 308. At operation 308, the in-flight entertainment device Bluetooth module 106 can identify Bluetooth channels corresponding to the most-used and/or most-congested WiFi channel identified in operation 306. As explained above (particularly with reference to FIG. 2A), the in-flight entertainment device Bluetooth module 106 can be configured to identify Bluetooth channels that correspond (and/or potentially conflict) with the most-utilized and/or most-congested WiFi channel identified in operation 306.

For example, if the in-flight entertainment device Bluetooth module 106 detects, in operation 306, that the most-utilized and/or most-used WiFi channel (from the perspective of the WiFi transceiver 110 of the in-flight entertainment device Bluetooth module 106) is channel 1, the in-flight entertainment device Bluetooth module 106 can identify the Bluetooth channels that operate on the same frequencies covered by WiFi channel 1 (e.g., 2.402 GHz (2402 MHz) to 2.422 GHz (2422 MHz)) in operation 308. In this example, the Bluetooth channels could be identified by the in-flight entertainment device Bluetooth module 106 as Bluetooth channels 0-19. Of course, the specific Bluetooth channels identified in operation 308 can depend on geographic location, ownership of the aircraft, and/or other factors that may shift the frequencies of the WiFi channels and therefore the corresponding frequencies of the Bluetooth channels. It should be understood that the above example embodiment is illustrative, and therefore should not be construed as being limiting in any way.

From operation 308, the method 300 can proceed to operation 310. At operation 310, the in-flight entertainment device Bluetooth module 106 can determine if the identified Bluetooth channels (e.g., the Bluetooth channels identified in operation 308 as corresponding to the most-used and/or most-congested WiFi channel identified in operation 306) are included in the exclusion list 124. As explained above, the Bluetooth channels listed in the exclusion list 124 can be avoided by the Bluetooth transceiver 116 and therefore may not be used for communications and/or connections between the in-flight entertainment device Bluetooth module 106 and other devices such as headphones or the like. Thus, operation 310 can include the in-flight entertainment device Bluetooth module 106 obtaining the exclusion list 124 (e.g., from the memory 136 or elsewhere) and searching the exclusion list 124 for one or more of the channels identified in operation 308. It should be understood that this example embodiment is illustrative, and therefore should not be construed as being limiting in any way.

If the in-flight entertainment device Bluetooth module 106 determines, in operation 310, that the identified Bluetooth channels (e.g., the Bluetooth channels identified in operation 308) are included in the exclusion list 124, the method 300 can proceed to operation 312. At operation 312, the in-flight entertainment device Bluetooth module 106 can execute a timer job or other process to create a time interval or delay that can be set by configurations and/or settings 134 associated with the in-flight entertainment device Bluetooth module 106. In some example embodiments, the timer job can be set to one second, five seconds, ten seconds, fifteen seconds, thirty seconds, one minute, five minutes, and/or other time intervals. This time interval can be set such that the most-congested and/or most-used WiFi channel can be determined periodically to maximize performance and/or to minimize collisions and/or interference between Bluetooth traffic and WiFi traffic in the proximity of the in-flight entertainment device Bluetooth module 106. It should be understood that this example embodiment is illustrative, and therefore should not be construed as being limiting in any way. After the timer job expires, the flow can return to operation 304 and the WiFi signals can again be scanned as illustrated and described herein.

In some other embodiments of the concepts and technologies disclosed herein, the timer job can be substituted with other types of prompts or controls for prompting the in-flight entertainment device Bluetooth module 106 to scan the WiFi signals. In particular, in some embodiments of the concepts and technologies disclosed herein, a prompt or command can be passed to the in-flight entertainment device Bluetooth module 106 (e.g., via the interface 130 and/or via the WiFi transceiver 110) to perform a scan of WiFi signals to test for congestion. Such a prompt or command can be issued by a network associated with the aircraft, for example, based on sensing a number of passengers connecting to the WiFi network and/or to Bluetooth-enabled devices on the aircraft, and/or by other entities. Thus, while the example embodiment of a timer job is shown in FIG. 3, this example is illustrative of one embodiment only. Other embodiments of the concepts and technologies disclosed herein can include prompting return of the flow of the method 300 from operation 310 to operation 304 based on other commands, requests, calls, messages, or the like. As such, it should be understood that this example embodiment is illustrative, and therefore should not be construed as being limiting in any way.

If the in-flight entertainment device Bluetooth module 106 determines, in operation 310, that the identified Bluetooth channels (e.g., the Bluetooth channels identified in operation 308) are not included in the exclusion list 124, the method 300 can proceed to operation 314. At operation 314, the in-flight entertainment device Bluetooth module 106 can update the exclusion list 124. In particular, operation 314 can correspond to the in-flight entertainment device Bluetooth module 106 adding the Bluetooth channels identified in operation 308 to the exclusion list 124. Furthermore, operation 314 can correspond to the in-flight entertainment device Bluetooth module 106 removing Bluetooth channels from the exclusion list 124.

In particular, in some embodiments of the concepts and technologies disclosed herein, the exclusion list 124 can be updated from time to time to remove previously excluded Bluetooth channels, though some Bluetooth channels may be permanently excluded for various reasons (e.g., crew use, security use, emergency use, or the like). As such, operation 314 can correspond to the addition of Bluetooth channels to the exclusion list 124 and/or the removal of previously excluded Bluetooth channels from the exclusion list 124. By way of example, the in-flight entertainment device Bluetooth module 106 may determine, in a first iteration of the method 300, that Bluetooth channels that correspond to WiFi channel 1 are to be excluded. In such a case, the Bluetooth channels corresponding to frequencies used by WiFi channel 1 may be added to the exclusion list 124. In a second iteration of the method 300, the in-flight entertainment device Bluetooth module 106 may determine that Bluetooth channels that correspond to WiFi channel 6 are to be excluded (i.e., that a most-used or most-congested WiFi channel changed from WiFi channel 1 to WiFi channel 6). In such a case, the Bluetooth channels corresponding to frequencies used by WiFi channel 6 may be added to the exclusion list 124 and Bluetooth channels corresponding to frequencies used by WiFi channel 1 may be removed from the exclusion list 124. It should be understood that this example embodiment is illustrative, and therefore should not be construed as being limiting in any way.

From operation 314, the method 300 can proceed to operation 316. At operation 316, the in-flight entertainment device Bluetooth module 106 can determine if the connection or Bluetooth session detected in operation 302 has ended. The in-flight entertainment device Bluetooth module 106 can determine that the connection or Bluetooth session detected in operation 302 has ended (or has not ended) by detecting a state associated with the Bluetooth transceiver 116 (e.g., is a device connected to the Bluetooth transceiver 116, is the session active, and the like). In some embodiments, the in-flight entertainment device Bluetooth module 106 can determine that the connection or Bluetooth session detected in operation 302 has ended (or has not ended) by examining the Bluetooth signal data 120 or other signals from the Bluetooth transceiver 116. Because the in-flight entertainment device Bluetooth module 106 can be configured to determine that the connection or Bluetooth session detected in operation 302 has ended or has not ended in additional and/or alternative manners, it should be understood that these example embodiments are illustrative, and therefore should not be construed as being limiting in any way.

If the in-flight entertainment device Bluetooth module 106 determines, in operation 316, that the connection or Bluetooth session detected in operation 302 has not ended, the method 300 can flow to operation 312, where a timer job can be executed and/or where other prompts or commands may return flow of the method 300 to operation 304 as explained above. If the in-flight entertainment device Bluetooth module 106 determines, in operation 316, that the connection or Bluetooth session detected in operation 302 has ended, the method 300 can flow to operation 318. The method 300 can end at operation 318.

Figure 4:
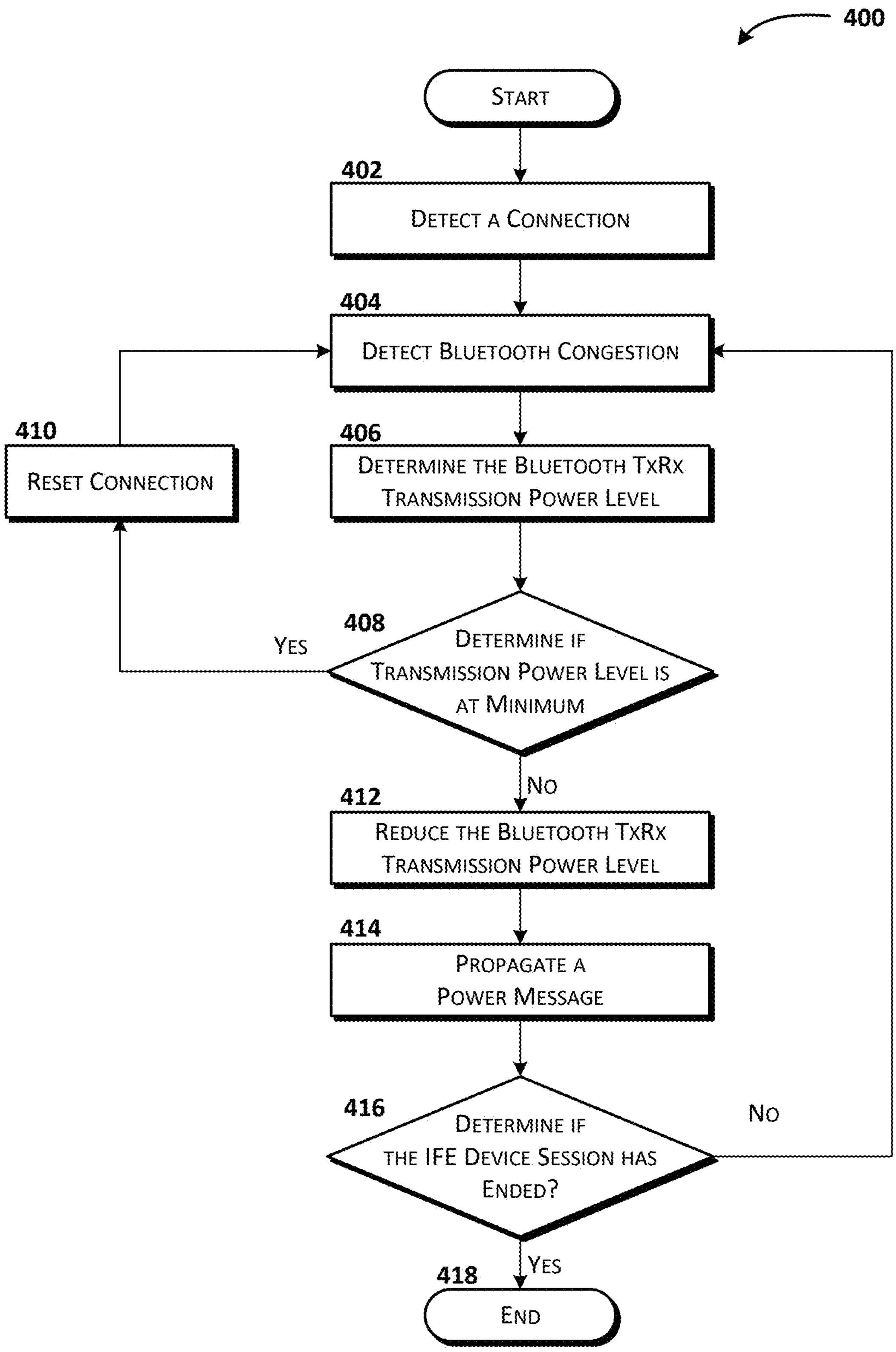
FIG. 4 is a flow diagram showing aspects of a method for adjusting a transmit power level of an in-flight entertainment device Bluetooth module to reduce congestion, according to an illustrative embodiment of the concepts and technologies described herein.

Turning now to FIG. 4, aspects of a method 400 for adjusting a transmit power level of an in-flight entertainment device Bluetooth module 106 will be described in detail, according to an illustrative embodiment. For purposes of illustrating and describing the concepts of the present disclosure, the method 400 is described herein as being performed by the in-flight entertainment device Bluetooth module 106 via execution of one or more software modules such as, for example, the control application 122. It should be understood that additional and/or alternative devices and/or network nodes can provide the functionality described herein via execution of one or more modules, applications, and/or other software including, but not limited to, the control application 122. Thus, the illustrated embodiments are illustrative, and should not be viewed as being limiting in any way.

The method 400 begins at operation 402. At operation 402, the in-flight entertainment device Bluetooth module 106 can detect a connection. As explained above with reference to operation 302 of the method 300, the connection detected in operation 402 can correspond to a Bluetooth connection between the in-flight entertainment device Bluetooth module 106 and a consumer device such as, for example, wireless headphones or earbuds of a passenger or crew, a user device of a passenger or crew, and/or other Bluetooth-enabled devices as illustrated and described herein. According to various embodiments, the Bluetooth connection detected in operation 402 can correspond to a Bluetooth connection between the in-flight entertainment device Bluetooth module 106 and a Bluetooth-enabled audio device (e.g., headphones, earbuds, a speaker, or the like). It should be understood that this example embodiment is illustrative, and therefore should not be construed as being limiting in any way.

In operation 402, the in-flight entertainment device Bluetooth module 106 can detect a state of the Bluetooth transceiver 116 and determine that an active connection exists between the Bluetooth transceiver 116 and an external Bluetooth-enabled audio device (e.g., via the directional Bluetooth antenna 118). In some other embodiments of the concepts and technologies disclosed herein, the in-flight entertainment device Bluetooth module 106 can perform operation 402 by analyzing Bluetooth signal data 120 (or other signals or state information) obtained from the Bluetooth transceiver 116 and/or monitored by the control application 122 or other entities, to determine that an audio device is connected to the in-flight entertainment device Bluetooth module 106. Because the connection can be detected in additional and/or alternative manners, it should be understood that these example embodiments are illustrative, and therefore should not be construed as being limiting in any way.

From operation 402, the method 400 can proceed to operation 404. At operation 404, the in-flight entertainment device Bluetooth module 106 can detect Bluetooth congestion (from the perspective of the Bluetooth transceiver 116). According to one example embodiment of the concepts and technologies disclosed herein, the in-flight entertainment device Bluetooth module 106 can perform operation 404 by determining that the Bluetooth transceiver 116 has performed active frequency hopping (for example, hopped from channel to channel to avoid interference and has done so a threshold number of times in the last number of seconds, e.g., two hops in five seconds, three hops in five seconds, five hops in ten seconds, or the like). It should be understood that this example embodiment is illustrative, and therefore should not be construed as being limiting in any way.

In some other embodiments, the in-flight entertainment device Bluetooth module 106 (e.g., at the perspective of the Bluetooth transceiver 116 thereof) may determine that communications have not been received or sent in a particular amount of time, or the like. It can be appreciated that the in-flight entertainment device Bluetooth module 106 can perform operation 404 by analyzing Bluetooth signal data 120, by analyzing output signals from the Bluetooth transceiver 116, by directly monitoring the Bluetooth transceiver 116, and/or in other ways and/or based on other signals or data. Because the Bluetooth congestion can be detected by the in-flight entertainment device Bluetooth module 106 in additional and/or alternative manners, it should be understood that these example embodiments are illustrative, and therefore should not be construed as being limiting in any way.

From operation 404, the method 400 can proceed to operation 406. At operation 406, the in-flight entertainment device Bluetooth module 106 can determine a transmission power level of the Bluetooth transceiver 116. In some embodiments of the concepts and technologies disclosed herein, the in-flight entertainment device Bluetooth module 106 can access the Bluetooth transceiver 116 and/or monitor the Bluetooth transceiver 116 to determine transmission power level. In some other embodiments, the Bluetooth signal data 120 can include a transmission power level of the Bluetooth transceiver 116. Because the in-flight entertainment device Bluetooth module 106 can determine transmission power level of the Bluetooth transceiver 116 in any number of ways (e.g., directly monitoring the Bluetooth transceiver 116, receiving transmission power information from the Bluetooth transceiver 116, measuring power output to the Bluetooth transceiver 116, or the like), it should be understood that these example embodiments are illustrative, and therefore should not be construed as being limiting in any way.

From operation 406, the method 400 can proceed to operation 408. At operation 408, the in-flight entertainment device Bluetooth module 106 can determine if the transmission power level of the Bluetooth transceiver 116 (as identified in operation 406) is at a defined minimum transmission power level. In some embodiments, the minimum transmission power level can be set to a level that can result in sufficient performance of the in-flight entertainment device Bluetooth module 106 while minimizing interference with other passengers and/or Bluetooth-enabled devices. In some embodiments of the concepts and technologies disclosed herein, the minimum transmission power level can be set to negative six decibels (−6 dB), i.e., six decibels below baseline output of the Bluetooth transceiver 116. In some other embodiments, the minimum transmission power level can be set to negative three decibels (−3 dB). Because other power transmission levels may be determined and/or set based on aircraft components, seat pitch, materials used in the aircraft, and/or other considerations, it should be understood that these example embodiments are illustrative, and therefore should not be construed as being limiting in any way.

Furthermore, it can be appreciated that the minimum transmission power level may be set differently in different parts of the aircraft and/or in different aircraft (relative to one another). In particular, seats in a first class section of a particular aircraft may have a first pitch (distance between seats) of, for example, thirty-nine inches while seats in an economy class section of the same aircraft may have a pitch of thirty-one inches. It therefore can be appreciated that a minimum transmission power level for in-flight entertainment device Bluetooth modules 106 in the first class section of the aircraft may be set at a first minimum transmission power level that may be greater than a second minimum transmission power level that can be set for in-flight entertainment device Bluetooth modules 106 in the economy class section of the aircraft (because the distances from a) the in-flight entertainment device Bluetooth module 106 to the intended passenger recipient, and b) the in-flight entertainment device Bluetooth module 106 to an unintended passenger recipient in the first class section can be greater than similar distances measured in the economy class section. As such, it can be appreciated that the minimum transmission power level for the in-flight entertainment device Bluetooth module 106 can be set per-device and stored as a configuration or setting. It should be understood that this example embodiment is illustrative, and therefore should not be construed as being limiting in any way.

As such, in operation 408, the in-flight entertainment device Bluetooth module 106 can retrieve (from configurations and/or settings 134 stored in the memory 136 of the in-flight entertainment device Bluetooth module 106) a minimum transmission power level, and compare the determined transmission power level of the Bluetooth transceiver 116 to the minimum transmission power level. If the in-flight entertainment device Bluetooth module 106 determines, in operation 408, that the determined transmission power level is at the minimum transmission power level, the method 400 can proceed to operation 410.

At operation 410, the in-flight entertainment device Bluetooth module 106 can reset the connection or take other actions to attempt to reduce interference between the in-flight entertainment device Bluetooth module 106 and other Bluetooth-enabled and/or WiFi-enabled devices. In some embodiments of the concepts and technologies disclosed herein, the in-flight entertainment device Bluetooth module 106 can display information indicating that a Bluetooth connection is not currently available, indicate a time after which the Bluetooth can be enabled again (e.g., start a timer job or other process to create a time interval or delay that is set by configurations and/or settings 134 associated with the in-flight entertainment device Bluetooth module 106), or the like. In some example embodiments, the timer job can be set to one second, five seconds, thirty seconds, one minute, five minutes, ten minutes, or the like. After the timer job expires, the connection is reset, or some other remedial actions are completed, the flow of the method 400 can return to operation 404 and the in-flight entertainment device Bluetooth module 106 can wait until Bluetooth congestion is again detected. It should be understood that this example embodiment is illustrative, and therefore should not be construed as being limiting in any way.

If the in-flight entertainment device Bluetooth module 106 determines, in operation 408, that the determined transmission power level not at the minimum transmission power level, the method 400 can proceed to operation 412. At operation 412, the in-flight entertainment device Bluetooth module 106 can reduce the transmission power level of the Bluetooth transceiver 116 and/or trigger reduction of the transmission power level of the Bluetooth transceiver 116. In some embodiments, the in-flight entertainment device Bluetooth module 106 can be configured to decrement the transmission power level through defined steps or amounts (e.g., apply a reduction of one decibel, one half decibel, or the like). In some other embodiments, the in-flight entertainment device Bluetooth module 106 may be configured to lower the transmission power level to the defined minimum transmission power level without making stepped adjustments. In various embodiments, the decrementing of transmission power level (making stepped adjustments) may be preferred, as such an approach may maintain better performance (e.g., sound quality) by maintaining transmission power level at a higher level (relative to the minimum transmission power level), though this is not the case in all embodiments. It should be understood that this example embodiment is illustrative, and therefore should not be construed as being limiting in any way.

From operation 412, the method 400 can proceed to operation 414. At operation 414, the in-flight entertainment device Bluetooth module 106 can generate and/or propagate a power message 128. As explained herein, the power message 128 can be propagated by the in-flight entertainment device Bluetooth module 106 to other devices and/or systems on the aircraft such as, for example, other in-flight entertainment device Bluetooth modules 106 (e.g., associated with other seats/passengers, crew, or the like), networking systems, network devices (e.g., access points, etc.), or the like. Thus, the in-flight entertainment device Bluetooth module 106 can be configured to generate the power message 128, which can indicate that transmission power level of the in-flight entertainment device Bluetooth module 106 has been reduced (and to what level), in some embodiments. In some other embodiments, the power message 128 can additionally, or alternatively, request other in-flight entertainment device Bluetooth modules 106 to reduce transmission power level of respective Bluetooth transceivers 116 to attempt to reduce interference. It should be understood that this example embodiment is illustrative, and therefore should not be construed as being limiting in any way.

From operation 414, the method 400 can proceed to operation 416. At operation 416, the in-flight entertainment device Bluetooth module 106 can determine if the connection or Bluetooth session detected in operation 402 has ended (or if the connection persists). The in-flight entertainment device Bluetooth module 106 can determine that the connection or Bluetooth session detected in operation 402 has ended (or has not ended) by detecting a state associated with the Bluetooth transceiver 116 (e.g., is a device connected to the Bluetooth transceiver 116, is the session active, and the like).

In some embodiments, the in-flight entertainment device Bluetooth module 106 can determine that the connection or Bluetooth session detected in operation 402 has ended (or has not ended) by examining the Bluetooth signal data 120 or other signals from the Bluetooth transceiver 116. Because the in-flight entertainment device Bluetooth module 106 can be configured to determine that the connection or Bluetooth session detected in operation 402 has ended or has not ended in additional and/or alternative manners, it should be understood that these example embodiments are illustrative, and therefore should not be construed as being limiting in any way.

If the in-flight entertainment device Bluetooth module 106 determines, in operation 416, that the connection or Bluetooth session detected in operation 402 has not ended, the method 400 can flow to operation 404, where the in-flight entertainment device Bluetooth module 106 can wait to detect Bluetooth congestion again as illustrated and described above. If the in-flight entertainment device Bluetooth module 106 determines, in operation 416, that the connection or Bluetooth session detected in operation 402 has ended, the method 400 can flow to operation 418. The method 400 can end at operation 418.

Although not shown in FIG. 4, it should be understood that embodiments of the concepts and technologies disclosed herein can also be configured to adjust transmission power level upwardly (i.e., to increase and/or increment (e.g., by one-half decibels, single decibels, or the like) transmission power level) in response to detecting that signal quality has degraded. In some such embodiments, the in-flight entertainment device Bluetooth module 106 can be configured to attempt to increase the transmission power level while measuring interference. Thus, if the transmission power level is raised and interference is detected, the in-flight entertainment device Bluetooth module 106 can be configured to lower the transmission power level. If, on the other hand, the transmission power level is raised and no interference is detected, the in-flight entertainment device Bluetooth can be configured to leave the transmission power level at the new elevated level. Thus, it can be appreciated that the embodiments illustrated and described herein can be configured to raise the transmission power level and/or to reduce the transmission power level. It should be understood that this example embodiment is illustrative, and therefore should not be construed as being limiting in any way.

Figure 5:
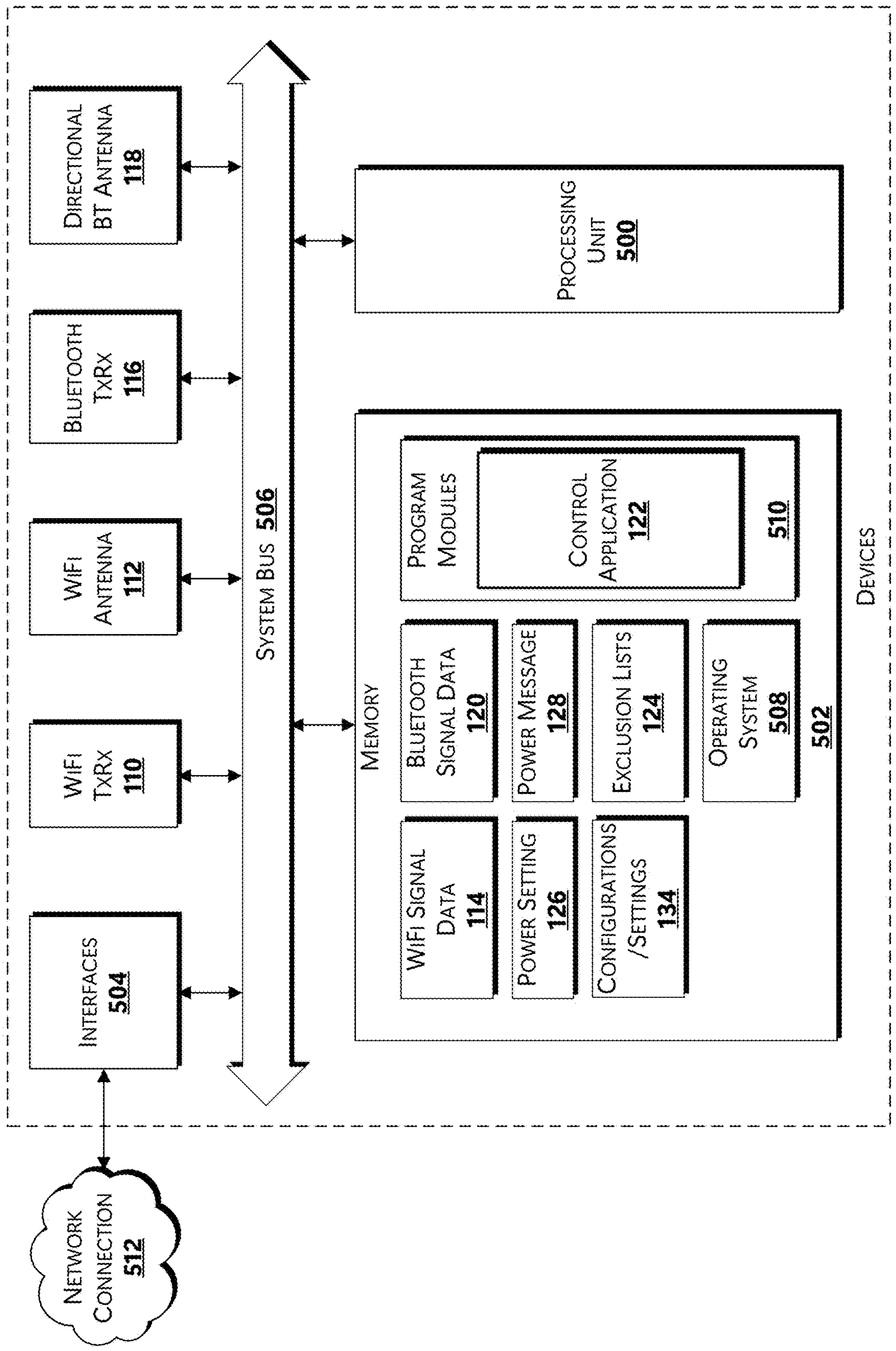
FIG. 5 is a block diagram illustrating an example computer system configured to in-flight entertainment device Bluetooth module, according to some illustrative embodiments of the concepts and technologies described herein.

FIG. 5 is a block diagram illustrating an example architecture of the in-flight entertainment device Bluetooth module 106, in accordance with various embodiments of the concepts and technologies disclosed herein. The in-flight entertainment system Bluetooth module 106 can include a processing unit 500, a memory 502 (which can be equivalent to and/or can be provided by the memory 136 shown in FIG. 1), one or more user interfaces 504 (which can include, for example, the interfaces 108 and 130 illustrated and described above with reference to FIG. 1), one or more WiFi transceivers 110, one or more WiFi antennas 112, one or more Bluetooth transceivers 116, and one or more directional Bluetooth antennas 118, each of which can be operatively connected to a system bus 506. The system bus 506 can enable bi-directional communication between the processing unit 500, the memory 502, the interfaces 504, the WiFi transceiver 110, the WiFi antenna 112, the Bluetooth transceiver 116, and the directional Bluetooth antenna 118.

The processing unit 500 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 502 can communicate with the processing unit 500 via the system bus 506. In some embodiments, the memory 502 can be operatively connected to a memory controller (not shown) that can enable communication with the processing unit 500 via the system bus 506. The memory 502 can store an operating system 508 and one or more program modules 510. The operating system 508 can include, but is not limited to, a firmware and/or various operating systems that are commercially available such as, for example, members of the WINDOWS families of operating systems from MICROSOFT CORPORATION, members of the LINUX family of operating systems, members of the SYMBIAN family of operating systems from SYMBIAN LIMITED, members of the BREW family of operating systems from QUALCOMM CORPORATION, members of the MAC OS and/or iOS families of operating systems from APPLE CORPORATION, members of the FREEBSD family of operating systems, the SOLARIS family of operating systems from ORACLE CORPORATION, other operating systems, and the like. Of course, the operating system 508 also can be custom written software for controlling the in-flight entertainment device Bluetooth module 106 in various embodiments of the concepts and technologies disclosed herein, so the above examples are illustrative and should not be construed as being limiting in any way.

The program modules 510 may include various software and/or program modules described herein. In some embodiments, for example, the program modules 510 can include the control application 122. This and/or other programs can be embodied in computer-readable media containing computer-executable instructions that, when executed by the processing unit 500, can cause the in-flight entertainment device Bluetooth module 106 and/or one or more components thereof to perform one or more of the methods 300 and 400 described in detail above with respect to FIGS. 3-4 and/or other functionality as illustrated and described herein. It can be appreciated that, at least by virtue of the instructions embodying the methods 300 and 400, and/or other functionality illustrated and described herein being stored in the memory 502 and/or accessed and/or executed by the processing unit 500, the in-flight entertainment system Bluetooth module 106 is a special-purpose computing system that can facilitate providing the functionality illustrated and described herein. According to embodiments, the program modules 510 may be embodied in hardware, software, firmware, or any combination thereof. As shown in FIG. 5, the memory 502 also can be configured to store the WiFi signal data 114, the Bluetooth signal data 120, the power setting 126, the power message 128, the configurations and/or settings 134, the exclusion lists 124, and/or other data, if desired.

By way of example, and not limitation, computer-readable media may include any available computer storage media or communication media that can be accessed by the in-flight entertainment system Bluetooth module 106. Communication media can include computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the in-flight entertainment system Bluetooth module 106. In the claims, the phrase "computer storage medium" and variations thereof does not include waves or signals per se and/or communication media as defined herein.

Although not shown in FIG. 5, it should be understood that various user interface devices may connect to the in-flight entertainment device Bluetooth module 106 (e.g., via the one or more interfaces 504). The user interfaces can include one or more devices with which a user can access the in-flight entertainment system Bluetooth module 106. The user interface devices can include, but are not limited to, keyboards, mice, touchscreens (e.g., the display 102 of the in-flight entertainment device 100, for example) or other input devices.

The interfaces 504 can also enable the in-flight entertainment system Bluetooth module 106 to communicate with other networks or remote systems (e.g., the headphone jack 104, other hardware 132 of the in-flight entertainment device 100, other in-flight entertainment devices 100 and/or in-flight entertainment device Bluetooth modules 106, combinations thereof, or the like) via interfaces (e.g., the interfaces 108 and 130) and/or a network connection 512. Examples of the network connections 512 can include, but are not limited to, wireless network such as, but not limited to, a wireless network connection such as a connection to a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, a cellular network; or a wired connection such as a connection to a Wide Area Network ("WAN") such as the Internet, a Local Area Network ("LAN") such as the Ethernet, a wired Personal Area Network ("PAN"), or a wired Metropolitan Area Network ("MAN"). It should be understood that these example embodiments are illustrative, and therefore should not be construed as being limiting in any way.

Based on the foregoing, it should be appreciated that an in-flight entertainment device Bluetooth module has been disclosed herein. Although the subject matter presented herein has been described with respect to various structural features and/or methodological and transformative acts for forming the In-flight entertainment device Bluetooth module and/or the various features thereof, it is to be understood that the concepts and technologies disclosed herein are not necessarily limited to the specific features or acts described herein. Rather, the specific features and acts are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An in-flight entertainment device Bluetooth module comprising:

a WiFi transceiver;

a WiFi antenna connected to the WiFi transceiver;

a Bluetooth transceiver;

a directional Bluetooth antenna connected to the Bluetooth transceiver;

a processor; and a memory storing computer-executable instructions that, when executed by the processor, cause the processor to perform operations comprising detecting a connection between the Bluetooth transceiver and an audio device via the directional Bluetooth antenna, triggering a WiFi signal scan by the WiFi transceiver and via the WiFi antenna, wherein the WiFi signal scan is performed to detect a most-used WiFi channel in proximity to the WiFi antenna, identifying, for a detected most-used WiFi channel, Bluetooth channels that share spectrum with the detected most-used WiFi channel, if a determination is made that the Bluetooth channels that share spectrum with the detected most-used WiFi channel are included in an exclusion list, waiting before scanning WiFi signals again, and if a determination is made that the Bluetooth channels that share spectrum with the detected most-used WiFi channel are not included in the exclusion list, adding, to the exclusion list, the Bluetooth channels that share spectrum with the detected most-used WiFi channel are included in the exclusion list.

2. The in-flight entertainment device Bluetooth module of claim 1, wherein detecting the most-used WiFi channel comprises receiving, from the WiFi transceiver, WiFi signal data that describes frequencies detected via the WiFi antenna, and detecting, based on analyzing the WiFi signal data, a most-congested WiFi channel from a perspective of the WiFi transceiver.

3. The in-flight entertainment device Bluetooth module of claim 1, wherein the computer-executable instructions, when executed by the processor, cause the processor to perform operations further comprising:

detecting, in association with the connection between the Bluetooth transceiver and the audio device, Bluetooth congestion;

determining a transmission power level being used by the Bluetooth transceiver;

determining if the transmission power level exceeds a minimum transmission power level; and if a determination is made that the transmission power level exceeds the minimum transmission power level, reducing the transmission power level used by the Bluetooth transceiver.

4. The in-flight entertainment device Bluetooth module of claim 3, wherein the computer-executable instructions, when executed by the processor, cause the processor to perform operations further comprising:

in response to the determination that the transmission power level exceeds the minimum transmission power level, propagating a power message that indicates that the transmission power level used by the Bluetooth transceiver has been reduced and that requests other devices to reduce their transmission power level to reduce interference.

5. The in-flight entertainment device Bluetooth module of claim 4, wherein the power message is propagated via the WiFi transceiver.

6. The in-flight entertainment device Bluetooth module of claim 4, wherein the power message is propagated via an interface with an in-flight entertainment device.

7. The in-flight entertainment device Bluetooth module of claim 3, wherein reducing the transmission power level used by the Bluetooth transceiver comprises sending a power setting to the Bluetooth transceiver, and wherein the Bluetooth transceiver reduces the transmission power level in response to receiving the power setting.

8. An in-flight entertainment device Bluetooth module comprising:

a WiFi transceiver;

a WiFi antenna connected to the WiFi transceiver;

a Bluetooth transceiver;

a directional Bluetooth antenna connected to the Bluetooth transceiver;

a processor; and a memory storing computer-executable instructions that, when executed by the processor, cause the processor to perform operations comprising detecting a connection between the Bluetooth transceiver and an audio device via the directional Bluetooth antenna, triggering a WiFi signal scan by the WiFi transceiver and via the WiFi antenna, wherein the WiFi signal scan is performed to detect a most-used WiFi channel in proximity to the WiFi antenna, identifying, for a detected most-used WiFi channel, Bluetooth channels that share spectrum with the detected most-used WiFi channel, if a determination is made that the Bluetooth channels that share spectrum with the detected most-used WiFi channel are included in an exclusion list, pausing before scanning WiFi signals again, and if a determination is made that the Bluetooth channels that share spectrum with the detected most-used WiFi channel are not included in the exclusion list, updating the exclusion list to include the Bluetooth channels that share spectrum with the detected most-used WiFi channel and to remove other Bluetooth channels previously included in the exclusion list that no longer share spectrum with the detected most-used WiFi channel.

9. The in-flight entertainment device Bluetooth module of claim 8, wherein detecting the most-used WiFi channel comprises receiving, from the WiFi transceiver, WiFi signal data that describes frequencies detected via the WiFi antenna, and detecting, based on analyzing the WiFi signal data, a most-congested WiFi channel from a perspective of the WiFi transceiver.

10. The in-flight entertainment device Bluetooth module of claim 8, wherein the computer-executable instructions, when executed by the processor, cause the processor to perform operations further comprising:

detecting, in association with the connection between the Bluetooth transceiver and the audio device, Bluetooth congestion;

determining a transmission power level being used by the Bluetooth transceiver;

determining if the transmission power level exceeds a minimum transmission power level; and if a determination is made that the transmission power level exceeds the minimum transmission power level, reducing the transmission power level used by the Bluetooth transceiver, and propagating a power message that indicates that the transmission power level used by the Bluetooth transceiver has been reduced and that requests other devices to reduce their transmission power level to reduce interference.

11. The in-flight entertainment device Bluetooth module of claim 10, wherein the computer-executable instructions, when executed by the processor, cause the processor to perform operations further comprising:

in response to the determination that the transmission power level does not exceed the minimum transmission power level, resetting the connection between the Bluetooth transceiver and the audio device via the directional Bluetooth antenna.

12. The in-flight entertainment device Bluetooth module of claim 8, wherein pausing comprises starting a timer job, wherein a duration of the timer job is included in settings stored in the memory.

13. The in-flight entertainment device Bluetooth module of claim 8, wherein pausing comprises waiting for an instruction to perform another WiFi signal scan.

14. An in-flight entertainment device comprising:

a WiFi transceiver;

a WiFi antenna connected to the WiFi transceiver;

a Bluetooth transceiver;

a directional Bluetooth antenna connected to the Bluetooth transceiver, wherein the directional Bluetooth antenna limits emission of Bluetooth signals to a first defined angle in a first direction and a second defined angle in a second direction;

a processor; and a memory storing computer-executable instructions that, when executed by the processor, cause the processor to perform operations comprising detecting a connection between the Bluetooth transceiver and an audio device via the directional Bluetooth antenna, triggering a WiFi signal scan by the WiFi transceiver and via the WiFi antenna, wherein the WiFi signal scan is performed to detect a most-used WiFi channel in proximity to the WiFi antenna, identifying, for a detected most-used WiFi channel, Bluetooth channels that share spectrum with the detected most-used WiFi channel, if a determination is made that the Bluetooth channels that share spectrum with the detected most-used WiFi channel are included in an exclusion list, pausing before performing a further WiFi signal scan, the pausing comprising one of executing a timer job or waiting for an instruction to perform the further WiFi signal scan, and if a determination is made that the Bluetooth channels that share spectrum with the detected most-used WiFi channel are not included in the exclusion list, updating the exclusion list to include the Bluetooth channels that share spectrum with the detected most-used WiFi channel and to remove other Bluetooth channels previously included in the exclusion list that no longer share spectrum with the detected most-used WiFi channel.

15. The in-flight entertainment device of claim 14, wherein the first defined angle is selected from an angle range including ten degrees to forty-five degrees, and wherein the second defined angle is selected from the angle range.

16. The in-flight entertainment device of claim 14, wherein the Bluetooth transceiver is initially set to a transmission power of negative six decibels.

17. The in-flight entertainment device of claim 14, wherein the computer-executable instructions, when executed by the processor, cause the processor to perform operations further comprising:

detecting, in association with the connection between the Bluetooth transceiver and the audio device, Bluetooth congestion;

determining a transmission power level being used by the Bluetooth transceiver;

determining if the transmission power level exceeds a minimum transmission power level;

if a determination is made that the transmission power level exceeds the minimum transmission power level, reducing the transmission power level used by the Bluetooth transceiver, and propagating a power message that indicates that the transmission power level used by the Bluetooth transceiver has been reduced and that requests other devices to reduce their transmission power level to reduce interference; and in response to the determination that the transmission power level does not exceed the minimum transmission power level, resetting the connection between the Bluetooth transceiver and the audio device via the directional Bluetooth antenna.

18. The in-flight entertainment device of claim 17, wherein the minimum transmission power level is set to negative six decibels.

19. The in-flight entertainment device of claim 14, wherein pausing comprises starting the timer job, and wherein a duration of the timer job is included in settings stored in the memory.

20. The in-flight entertainment device of claim 14, wherein waiting for the instruction comprises waiting for a command from a network device.

* * * * *